(12) United States Patent
Shintani et al.

(10) Patent No.: US 10,240,491 B2
(45) Date of Patent: Mar. 26, 2019

(54) CONTROL SYSTEM OF ENGINE

(71) Applicant: Mazda Motor Corporation, Aki-gun, Hiroshima (JP)

(72) Inventors: Shuhei Shintani, Hiroshima (JP); Takuji Okumura, Kure (JP); Hiroaki Horiuchi, Hiroshima (JP); Shigeru Nakagawa, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 251 days.

(21) Appl. No.: 15/007,468

(22) Filed: Jan. 27, 2016

(65) Prior Publication Data

US 2016/0245128 A1   Aug. 25, 2016

(30) Foreign Application Priority Data

Feb. 19, 2015   (JP) .................. 2015-030912

(51) Int. Cl.
*B60T 7/12* (2006.01)
*F01L 1/34* (2006.01)
(Continued)

(52) U.S. Cl.
CPC .................. *F01L 1/34* (2013.01); *F01L 1/344* (2013.01); *F02D 13/0207* (2013.01);
(Continued)

(58) Field of Classification Search
CPC ........ F02M 26/01; F02M 26/23; F02M 26/47; F02M 2026/009; F02M 25/10; F02D 13/0207; F02D 13/0219; F02D 35/02; F02D 35/026; F02D 41/0062; F02D 41/3029; F02D 41/3064; F02D 2041/001;
(Continued)

(56) References Cited

U.S. PATENT DOCUMENTS 6,336,436 B1 * 1/2002 Miyakubo ................. F02B 1/12
                                                    123/295
6,718,957 B2 * 4/2004 Miyakubo ........... F02D 13/0219
                                                    123/568.14

(Continued)

FOREIGN PATENT DOCUMENTS

JP   2009085175   *   4/2009   ........... Y02T 10/125
JP   4737103 B2   7/2011

*Primary Examiner* — Hung Q Nguyen
*Assistant Examiner* — Anthony Donald Taylor, Jr.
(74) *Attorney, Agent, or Firm* — Alleman Hall Creasman & Tuttle LLP

(57) ABSTRACT

A control system of an engine is provided. The control system includes an exhaust variable valve mechanism for changing an operation mode of an exhaust valve, a fuel injection controlling module for controlling a fuel injector to inject fuel at a fuel injection timing associated with an operating state of the engine, a variable valve mechanism controlling module for operating the exhaust valve via the exhaust variable valve mechanism in a first operation mode when the operating state of the engine is within a compression self-ignition range, and in a second operation mode when the operating state of the engine is within a spark-ignition range, and a first in-cylinder state quantity estimating module for estimating a first state quantity inside the cylinder relating to a burned gas amount within the cylinder.

12 Claims, 10 Drawing Sheets

(51) Int. Cl.
| | |
|---|---|
| *F02M 26/23* | (2016.01) |
| *F02M 26/01* | (2016.01) |
| *F02D 41/00* | (2006.01) |
| *F02D 41/30* | (2006.01) |
| *F02D 35/02* | (2006.01) |
| *F02D 13/02* | (2006.01) |
| *F02M 26/47* | (2016.01) |
| *F01L 1/344* | (2006.01) |
| *F02M 26/00* | (2016.01) |
| *F02B 1/12* | (2006.01) |
| *F02B 17/00* | (2006.01) |
| *F02M 25/10* | (2006.01) |

(52) U.S. Cl.
CPC ......... *F02D 13/0219* (2013.01); *F02D 35/02* (2013.01); *F02D 35/026* (2013.01); *F02D 41/0062* (2013.01); *F02D 41/3029* (2013.01); *F02M 26/01* (2016.02); *F02M 26/23* (2016.02); *F02M 26/47* (2016.02); *F02B 1/12* (2013.01); *F02B 17/005* (2013.01); *F02D 41/3064* (2013.01); *F02D 2041/001* (2013.01); *F02M 25/10* (2013.01); *F02M 2026/009* (2016.02); *Y02T 10/128* (2013.01); *Y02T 10/18* (2013.01); *Y02T 10/47* (2013.01)

(58) Field of Classification Search
CPC ........ F02B 1/12; F02B 17/005; Y02T 10/128; Y02T 10/18; Y02T 10/47; F01L 1/34; F01L 1/344
USPC .................................................. 701/102–105
See application file for complete search history.

(56) References Cited

U.S. PATENT DOCUMENTS

| | | | | |
|---|---|---|---|---|
| 6,968,825 | B2* | 11/2005 | Hitomi | F01L 1/053 123/406.11 |
| 7,117,666 | B2* | 10/2006 | Tomita | F02D 41/024 60/282 |
| 7,367,310 | B2* | 5/2008 | Kakuya | F02D 37/02 123/295 |
| 7,669,578 | B2 | 3/2010 | Yamashita et al. | |
| 7,717,084 | B2* | 5/2010 | Kurotani | F02B 1/08 123/295 |
| 7,966,991 | B2* | 6/2011 | Kang | F02D 41/3035 123/295 |
| 7,992,541 | B2* | 8/2011 | Petridis | F01L 1/25 123/347 |
| 8,838,364 | B2* | 9/2014 | Nagatsu | F02D 13/0234 123/294 |
| 8,955,492 | B2* | 2/2015 | Wermuth | F02B 17/005 123/305 |
| 9,002,623 | B2* | 4/2015 | Cowgill | F02D 41/006 123/294 |
| 9,328,688 | B2* | 5/2016 | Hitomi | F02D 41/3035 |
| 9,429,087 | B2* | 8/2016 | Iwai | F02B 23/101 |
| 9,429,096 | B2* | 8/2016 | Hellstrom | F02D 35/025 |
| 9,617,945 | B2* | 4/2017 | Takahashi | F02D 41/3011 |
| 2008/0178836 | A1* | 7/2008 | Yamashita | F02B 17/00 123/295 |
| 2009/0198431 | A1* | 8/2009 | Cleary | F02B 17/005 701/103 |
| 2010/0269771 | A1* | 10/2010 | Wermuth | F02D 13/0211 123/90.16 |
| 2011/0295487 | A1* | 12/2011 | Ramappan | F02B 1/12 701/103 |

* cited by examiner

CONTROL SYSTEM OF ENGINE

BACKGROUND

The present invention relates to a control system of an engine, particularly to a control system of an engine where compression self-ignition combustion is performed when an operating state of the engine is within a predetermined compression self-ignition range, and spark-ignition combustion is performed when the operating state of the engine is within a predetermined spark-ignition range.

Conventionally, engines which perform compression-ignition combustion triggered by pre-mixture compression self-ignition (Homogeneous-Charge Compression Ignition: HCCI) are known. Such engines which perform the HCCI combustion use a so-called internal exhaust gas recirculation (EGR) system for opening an exhaust valve in a predetermined valve-open period during an intake operation to reverse burned gas back into a combustion chamber from an exhaust port, so as to increase a temperature of a mixture gas inside the combustion chamber.

However, an operating range of the engine where the HCCI combustion can stably be performed is limited to a range where an engine speed and an engine load are relatively low (HCCI range). Therefore, in the engines which perform the HCCI combustion, the HCCI combustion is performed when the operating state of the engine is within the HCCI range, and when the operating state of the engine is within an operating range where the engine speed and the engine load are relatively high, which is outside the HCCI range, SI (Spark-Ignition) combustion is performed.

For example, in a case where a vehicle operator steps onto an accelerator pedal while the operating state of the engine is within the HCCI range and the engine is operated by the HCCI combustion, and a request load on the engine is thus increased and the operating range of the engine is shifted from the HCCI range to an operating range where the SI combustion is performed (SI range), an operation mode of the exhaust valve is required to be switched from a mode for the HCCI combustion to a mode for the SI combustion and combustion control parameters (e.g., an injection amount of fuel and an injection timing thereof) are also required to be switched from set values for the HCCI combustion to set values for the SI combustion.

In the switch of the combustion mode between the HCCI combustion and the SI combustion as above, an internal EGR amount in a transition period for the operation mode of the exhaust valve to switch is insufficient for the HCCI combustion, whereas it is excessive for the SI combustion, which may cause unstable combustion and/or knocking.

In this regard, for example, JP4737103B discloses a control system of an engine. With this control system, when switching the combustion mode, a pre-mixture gas is first formed substantially uniformly inside a cylinder, fuel is injected by a fuel injector on a compression stroke to form a stratified mixture gas concentrating around an ignition plug, and then the stratified mixture gas is ignited to combust (stratified spark-ignition combustion), so as to induce self-ignition of the pre-mixture gas. By assisting the self-ignition of the pre-mixture gas with the spark-ignition combustion of the stratified mixture gas around the ignition plug as above, unstable combustion can be prevented and a sufficient engine torque can be obtained by the self-ignition combustion.

However, in the stratified spark-ignition combustion described above, a generation amount of nitrogen oxide increases when a rich mixture gas formed around the ignition plug is combusted, and thus, emission performance degrades. Additionally, fuel consumption degrades due to the increase of the fuel injection amount.

Therefore, it is desirable to shorten as much as possible the period of performing the stratified spark-ignition combustion when switching the combustion mode; however, with the conventional art described above, since the period of performing the stratified spark-ignition combustion is determined based on a time length from the start of switching the combustion mode or a combustion cycle, the stratified spark-ignition combustion may continue even in a situation where the SI combustion or the HCCI combustion can stably be performed, which leaves space for improving the emission performance and the fuel consumption.

SUMMARY

The present invention is made in view of the above situations and aims to provide a control system of an engine, which can prevent unstable combustion while suppressing degradation of emission performance and fuel consumption when switching a combustion mode of the engine between HCCI combustion and SI combustion.

According to one aspect of the present invention, a control system of an engine where compression self-ignition combustion is performed when an operating state of the engine is within a predetermined compression self-ignition range, and spark-ignition combustion is performed when the operating state of the engine is within a predetermined spark-ignition range is provided. The control system includes an exhaust variable valve mechanism for changing an operation mode of an exhaust valve of the engine, a fuel injection controlling module for controlling a fuel injector of the engine to inject fuel at a fuel injection timing associated with the operating state of the engine, a variable valve mechanism controlling module for operating the exhaust valve via the exhaust variable valve mechanism in a first operation mode when the operating state of the engine is within the compression self-ignition range, and operating the exhaust valve via the exhaust variable valve mechanism in a second operation mode when the operating state of the engine is within the spark-ignition range, the first operation mode being a mode where the exhaust valve is opened on intake stroke to reintroduce burned gas into a cylinder of the engine from an exhaust port of the engine, and the second operation mode being a mode where the exhaust valve is closed at a timing advanced from a closing timing of the exhaust valve in the first operation mode, and a first in-cylinder state quantity estimating module for estimating a first state quantity inside the cylinder relating to a burned gas amount within the cylinder. When the operating state of the engine is switched between the spark-ignition range and the compression self-ignition range, the fuel injection controlling module controls the fuel injection timing based on the first state quantity inside the cylinder.

With this configuration, the fuel injection controlling module controls the fuel injection timing based on the first state quantity inside the cylinder when the operating state of the engine is switched between the spark-ignition range and the compression self-ignition range. Therefore, a fuel injection timing suitable for the burned gas amount inside the cylinder which correlates with the combustion stability can be applied, and thus, when switching the combustion mode of the engine between the compression self-ignition combustion and the spark-ignition combustion, unstable combustion can be prevented while suppressing degradation of emission performance and a fuel consumption.

When the operating state of the engine is switched from the compression self-ignition range to the spark-ignition range, in a case where the first state quantity inside the cylinder is within a predetermined spark-ignition combustion threshold range where the spark-ignition combustion is performable, the fuel injection controlling module preferably applies a fuel injection timing associated with the spark-ignition combustion, and in a case where the first state quantity inside the cylinder is outside the spark-ignition combustion threshold range, the fuel injection controlling module preferably applies a fuel injection timing associated with stratified spark-ignition combustion that is performed by forming a substantially uniform pre-mixture gas inside the cylinder on the intake stroke, then injecting the fuel on compression stroke to form stratified mixture gas around an ignition plug of the engine, and spark-igniting the stratified mixture gas to combust the stratified mixture gas along with the pre-mixture gas.

With this configuration, when the operating state of the engine is switched from the compression self-ignition range to the spark-ignition range, if the inside of the cylinder is in a state where the spark-ignition combustion cannot stably be performed, a fuel injection timing associated with the stratified spark-ignition combustion is applied. Therefore, a length of a period in which the stratified spark-ignition combustion is performed can be limited to a necessary length, and thus, when switching the combustion mode of the engine from the compression self-ignition combustion to the spark-ignition combustion, the unstable combustion can be prevented while suppressing the degradation of the emission performance and the fuel consumption.

When the first state quantity inside the cylinder is outside the spark-ignition combustion threshold range and is within a predetermined compression self-ignition combustion threshold range where the compression self-ignition combustion is performable, the fuel injection controlling module preferably applies a fuel injection timing associated with the compression self-ignition combustion.

With this configuration, when the operating state of the engine is switched from the compression self-ignition range to the spark-ignition range, if the inside of the cylinder is in a state where the compression self-ignition combustion can stably be performed, the compression self-ignition combustion is continued. Therefore, the length of the period in which the stratified spark-ignition combustion is performed can be limited to a necessary length, and thus, when switching the combustion mode of the engine from the compression self-ignition combustion to the spark-ignition combustion, the unstable combustion can be prevented while suppressing the degradation of the emission performance and the fuel consumption.

With this configuration, while the fuel injection timing associated with the stratified spark-ignition combustion is applied, when the first state quantity inside the cylinder reaches a value inside the spark-ignition combustion threshold range, the fuel injection controlling module preferably switches the fuel injection timing to the fuel injection timing associated with the spark-ignition combustion.

With this configuration, the in-cylinder state is estimated even while the stratified spark-ignition combustion is performed, and the combustion mode is shifted to the spark-ignition combustion once the inside of the cylinder reaches the state where the spark-ignition combustion can stably be performed. Therefore, the length of the period in which the stratified spark-ignition combustion is performed can be limited to a necessary length, and thus, when switching the combustion mode of the engine from the compression self-ignition combustion to the spark-ignition combustion, the unstable combustion can be prevented while suppressing the degradation of the emission performance and the fuel consumption.

When the operating state of the engine is switched from the spark-ignition range to the compression self-ignition range, in a case where the first state quantity inside the cylinder is within the predetermined compression self-ignition combustion threshold range where the compression self-ignition combustion is performable, the fuel injection controlling module preferably applies the fuel injection timing associated with the compression self-ignition combustion, and in a case where the first state quantity inside the cylinder is outside the compression self-ignition combustion threshold range, the fuel injection controlling module preferably applies the fuel injection timing associated with the stratified spark-ignition combustion.

With this configuration, when the operating state of the engine is switched from the spark-ignition range to the compression self-ignition range, if the inside of the cylinder is in a state where the compression self-ignition combustion cannot stably be performed, the fuel injection timing associated with the stratified spark-ignition combustion is applied. Therefore, the length of the period in which the stratified spark-ignition combustion is performed can be limited to a necessary length, and thus, when switching the combustion mode of the engine from the spark-ignition combustion and the compression self-ignition combustion, the unstable combustion can be prevented while suppressing the degradation of the emission performance and the fuel consumption.

The control system preferably also includes a second in-cylinder state quantity estimating module for estimating a second state quantity inside the cylinder relating to a temperature inside the cylinder. When the operating state of the engine is switched between the spark-ignition range and the compression self-ignition range, the fuel injection controlling module preferably controls the fuel injection timing based on the first state quantity inside the cylinder estimated by the first in-cylinder state quantity estimating module and the second state quantity inside the cylinder estimated by the second in-cylinder state quantity estimating module.

With this configuration, when the operating state of the engine is switched between the spark-ignition range and the compression self-ignition range, the fuel injection controlling module controls the fuel injection timing based on the second state quantity relating to the temperature inside the cylinder, estimated by the second in-cylinder state quantity estimating module. Therefore, a more suitable fuel injection timing can be applied according to the temperature inside the cylinder which correlates with the combustion stability, and thus, when switching the combustion mode of the engine between the compression self-ignition combustion and the spark-ignition combustion, the unstable combustion can be prevented more securely while suppressing even more effectively the degradation of the emission performance and the fuel consumption.

The first in-cylinder state quantity estimating module preferably estimates, as the first state quantity inside the cylinder, a ratio of the burned gas amount with respect to a total gas amount introduced into the cylinder.

With this configuration, when the operating state of the engine is switched between the spark-ignition range and the compression self-ignition range, the fuel injection controlling module controls the fuel injection timing based on the ratio of the burned gas amount with respect to the total gas amount introduced into the cylinder. Therefore, a more suitable fuel injection timing can be applied, and thus, when switching the combustion mode of the engine between the compression self-ignition combustion and the spark-ignition combustion, the unstable combustion can be prevented more securely while suppressing even more effectively the degradation of the emission performance and the fuel consumption.

The first in-cylinder state quantity estimating module preferably calculates an external burned gas ratio and an internal burned gas ratio and preferably estimates, based on the calculated external and internal burned gas ratios, the ratio of the burned gas amount with respect to the total gas amount introduced into the cylinder of the engine, the external burned gas ratio being a ratio of burned gas recirculated back into an intake passage of the engine with respect to intake air passed through an intake valve of the engine, and the internal burned gas being a ratio of the burned gas reintroduced into the cylinder from the exhaust port by opening the exhaust valve on the intake stroke, with respect to the total gas amount introduced into the cylinder.

With this configuration, the ratio of the burned gas with respect to the total gas amount introduced into the cylinder of the engine can be estimated more accurately, and thus, when switching the combustion mode of the engine between the compression self-ignition combustion and the spark-ignition combustion, the unstable combustion can be prevented more securely while suppressing even more effectively the degradation of the emission performance and the fuel consumption.

BRIEF DESCRIPTION OF THE DRAWINGS

FIGS. 4A to 4C are views illustrating lift curves of intake and exhaust valves according to the embodiment of the present invention, in which FIG. 4A illustrates lift curves for a low engine load side of an HCCI range of the engine, FIG. 4B illustrates lift curves for a high engine load side of the HCCI range of the engine, and FIG. 4C illustrates lift curves of the intake and exhaust valves within an SI range of the engine.

DETAILED DESCRIPTION OF EMBODIMENT

Hereinafter, a control system of an engine according to one embodiment of the present invention is described with reference to the appended drawings.

[System Configuration]

Figure 1:
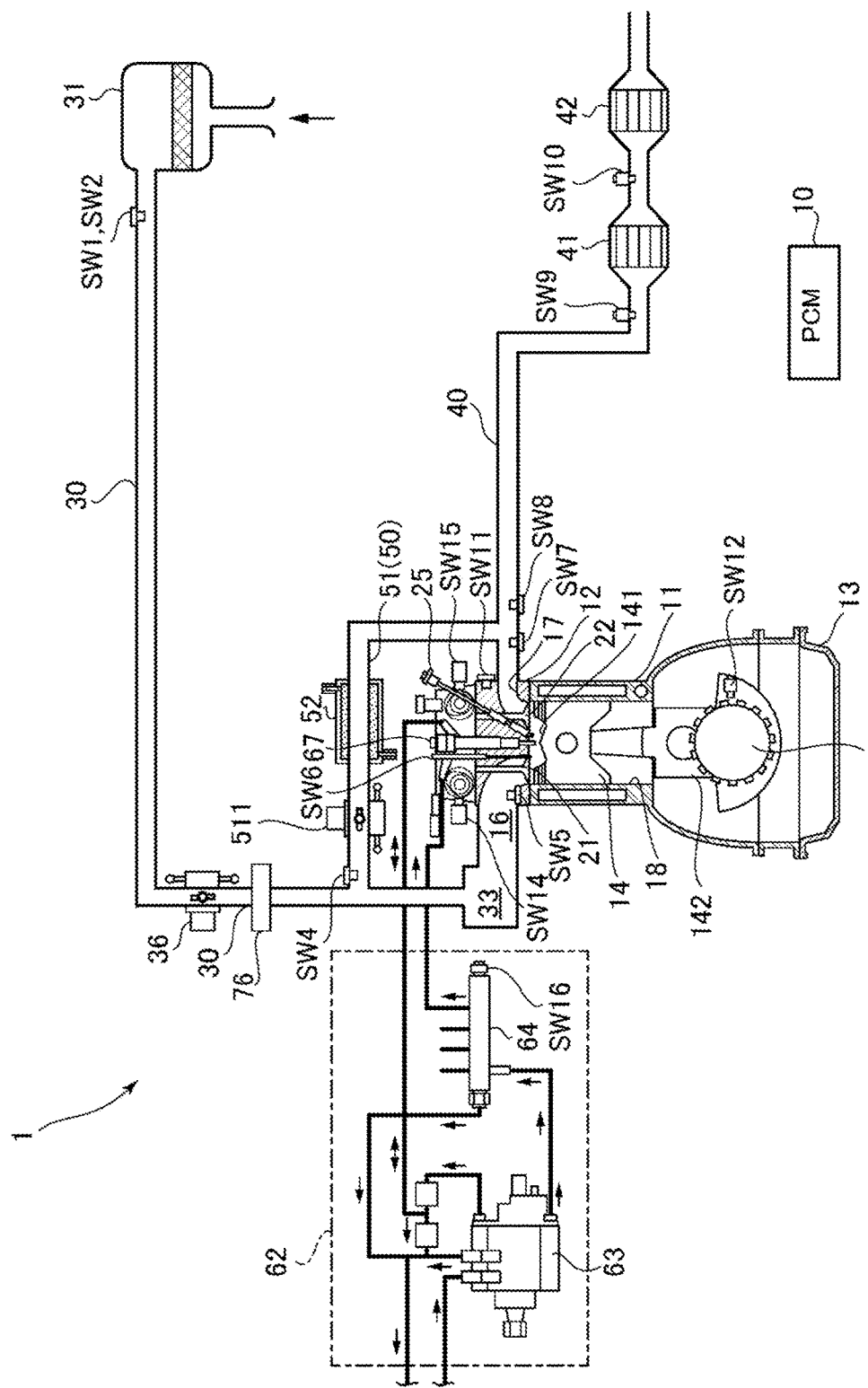
FIG. 1 is a view illustrating a schematic configuration of an engine to which a control system according to one embodiment of the present invention is applied.
Figure 2:
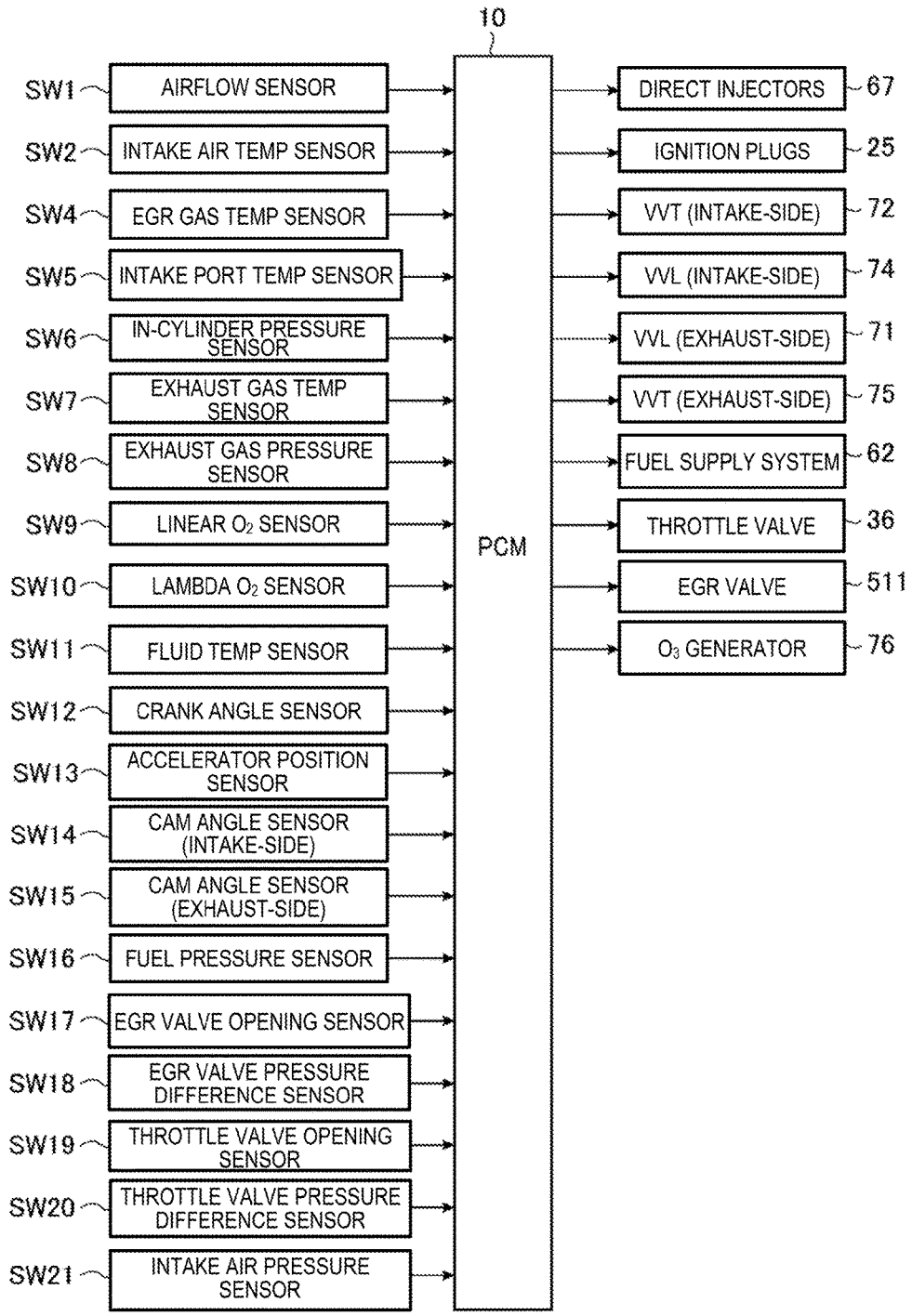
FIG. 2 is a block diagram illustrating an electric configuration regarding the control system of the engine according to the embodiment of the present invention.

FIG. 1 is a view illustrating a schematic configuration of an engine 1 to which a control system according to one embodiment of the present invention is applied. FIG. 2 is a block diagram illustrating the control system of the engine according to the embodiment of the present invention.

The engine 1 is a gasoline engine that is mounted on a vehicle and supplied with fuel containing at least gasoline. The engine 1 includes a cylinder block 11 provided with a plurality of cylinders 18 (note that although only one cylinder is illustrated in FIG. 1, for example, four cylinders are linearly provided in this embodiment), a cylinder head 12 disposed on the cylinder block 11, and an oil pan 13 disposed below the cylinder block 11 and storing a lubricant. Reciprocatable pistons 14 are coupled to a crankshaft 15 via a connecting rod 142 and fitted into each of the cylinders 18, respectively. A cavity 141 having a reentrant shape, such as the shape generally used in a diesel engine, is formed on a top surface of each piston 14. When a piston 14 is at a position near a top dead center on compression stroke (CTDC), the cavity 141 is located opposite to an injector 67, described later. The cylinder head 12, the cylinders 18, and the pistons 14 each formed with the respective cavities 141 define combustion chambers 19. Note that the shape of each combustion chamber 19 is not limited to the shape in the drawings. For example, the shape of the cavity 141, the shape of the top surface of the piston 14, and the shape of a ceiling part of the combustion chamber 19 may suitably be changed.

A geometric compression ratio of the engine 1 is designed to be 15:1 or higher, which is comparatively high, so as to improve theoretical thermal efficiency and stabilize compression-ignition combustion (described later), etc. Note that the geometric compression ratio may suitably be designed within a range between about 15:1 and 20:1.

In the cylinder head 12, each of the cylinders 18 is formed with an intake port 16 and an exhaust port 17 and provided with an intake valve 21 for opening and closing the intake port 16 on the combustion chamber 19 side and an exhaust valve 22 for opening and closing the exhaust port 17 on the combustion chamber 19 side.

In a valve train of the engine 1 for operating the intake and exhaust valves 21 and 22, for example, a hydraulically-actuated variable valve lift mechanism (see FIG. 2; hereinafter referred to as the VVL (Variable Valve Lift)) 71 for switching an operation mode of the exhaust valve 22 between a normal mode and a special mode, and a phase variable mechanism (hereinafter referred to as the VVT (Variable Valve Timing)) 75 for changing a rotational phase of an exhaust camshaft with respect to the crankshaft 15, are provided on an exhaust side. The VVL 71 (the detailed configuration is not illustrated) includes two kinds of cams with different profiles in which a first cam has one cam nose and a second cam has two cam noses, and a lost motion mechanism for selectively transmitting an operating state of one of the first and second cams to the exhaust valve 22. While the lost motion mechanism transmits the operating state of the first cam to the exhaust valve 22, the exhaust valve 22 operates in the normal mode (where it opens only once during exhaust stroke. On the other hand, while the lost motion mechanism transmits the operating state of the second cam to the exhaust valve 22, the exhaust valve 22 operates in the special mode, which is a so-called exhaust open-twice control, where it opens once during the exhaust stroke and once more during the intake stroke. The normal and special modes of the VVL 71 are switched therebetween according to an operating state of the engine. Specifically, the special mode is utilized during a control regarding an internal EGR. Note that in enabling the switch between the normal mode and the special mode, an electromagnetic valve train for operating the exhaust valve 22 by an electromagnetic actuator may be adopted.

Note that the internal EGR is not limited to being achieved by the exhaust open-twice control only. For example, an internal EGR control by an intake open-twice control in which the intake valve 21 opens twice may be performed, or an internal EGR control in which burned gas remains inside the cylinder 18 by providing a negative overlap period in which both the intake and exhaust valves 21 and 22 are closed on one of the exhaust stroke and the intake stroke may be performed.

For the VVT 75, a known structure of any one of hydraulic, electromagnetic and mechanical types may suitably be adopted, and a detailed structure thereof is not illustrated. Opening and closing timings of the exhaust valve 22 can be varied within a predetermined range by the VVT 75.

Similarly to the exhaust side of the valve train including the VVL 71 and the VVT 75, an intake side of the valve train includes a VVL 74 and a VVT 72 as illustrated in FIG. 2. The VVL 74 on the intake side is different from the VVL 71 on the exhaust side. The VVL 74 on the intake side includes two kinds of cams with different profiles in which a high lift cam relatively increases the lift of the intake valve 21 and a low lift cam relatively reduces the lift of the intake valve 21, and a lost motion mechanism for selectively transmitting an operating state of either one of the large and low lift cams to the intake valve 21. While the VVL 74 transmits the operating state of the high lift cam to the intake valve 21, the intake valve 21 opens with a relatively high lift, and an open period thereof is long. On the other hand, while the VVL 74 transmits the operating state of the low lift cam to the intake valve 21, the intake valve 21 opens with a relatively low lift, and the open period thereof is short. The high lift cam and the low lift cam are designed to switch therebetween to synchronize one of the closing and opening timings thereof.

Also for the VVT 72 on the intake side, similarly to the VVT 75 on the exhaust side, a known structure of any one of hydraulic, electromagnetic, and mechanical types may suitably be adopted, and a detailed structure thereof is not illustrated. Opening and closing timings of the intake valve 21 can also be varied within a predetermined range by the VVT 72. Note that it may be such that the VVL 74 is omitted and only the VVT 72 is applied on the intake side, so that only the opening and closing timings of the intake valve 21 are changed.

For each cylinder 18, the (direct) injector 67 for directly injecting the fuel into the cylinder 18 is attached to the cylinder head 12. The injector 67 is arranged so that its nozzle hole is oriented toward the inside of the combustion chamber 19 from a center portion of a ceiling surface of the combustion chamber 19. The injector 67 directly injects into the combustion chamber 19 an amount of fuel corresponding to the operating state of the engine 1 at an injection timing designed according to the operating state of the engine 1. In this embodiment, the injector 67 (a detailed configuration is not illustrated) is a multi-hole injector formed with a plurality of nozzle holes. Thus, the injector 67 injects the fuel so that the fuel spray spreads radially from the center portion of the combustion chamber 19. At a timing when the piston 14 is near the CTDC, the fuel spray injected to spread radially from the center portion of the combustion chamber 19 flows along a wall surface of the cavity 141 formed in the piston top surface. Therefore, it may be said that the cavity 141 is formed to contain therewithin the fuel spray injected at the timing when the piston 14 is near the CTDC. The combination of the multi-hole injector 67 and the cavity 141 is advantageous, after the fuel is injected, in shortening a mixture gas forming period and the combustion period. Note that the injector 67 is not limited to being the multi-hole injector, and may be an outward-opening valve-type injector.

A fuel supply path couples a fuel tank (not illustrated) to the injectors 67. A fuel supply system 62 for supplying the fuel to each of the injectors 67 at a comparatively high fuel pressure and having a fuel pump 63 and a common rail 64 is provided within the fuel supply path. The fuel pump 63 feeds the fuel from the fuel tank to the common rail 64, and the common rail 64 can accumulate the fed fuel at a comparatively high fuel pressure. By opening the nozzle holes of the injector 67, the fuel accumulated in the common rail 64 is injected from the nozzle holes of the injector 67. Here, the fuel pump 63 is a plunger-type pump (not illustrated) and is operated by the engine 1. The fuel supply system 62, including the engine-operated pump, enables the supply of the fuel to the injector 67 at a high fuel pressure of 30 MPa or higher. A highest value of the fuel pressure may be about 120 MPa. As described later, the pressure of the fuel supplied to the injector 67 is changed according to the operating state of the engine 1. Note that the fuel supply system 62 is not limited to the above configuration.

Further, an ignition plug 25 for forcibly igniting the mixture gas inside the combustion chamber 19 is attached to the cylinder head 12 for each cylinder 18. In this embodiment, the ignition plug 25 is arranged to penetrate the cylinder head 12 so as to extend obliquely downward from the exhaust side of the engine 1. The ignition plug 25 is arranged so that its tip is oriented toward the inside of the cavity 141 of the piston 14 at the CTDC.

On one side surface of the engine 1, as illustrated in FIG. 1, an intake passage 30 is connected to communicate with the intake ports 16 of the respective cylinders 18. On the other side surface of the engine 1, an exhaust passage 40 is connected to guide out the burned gas (exhaust gas) discharged from the combustion chambers 19 of the respective cylinders 18.

An air cleaner 31 for filtrating intake air is disposed in an upstream end part of the intake passage 30, and a throttle valve 36 for adjusting an intake air amount to the cylinders 18 is disposed downstream of the air cleaner 13. Further, a surge tank 33 is disposed near a downstream end of the intake passage 30. A part of the intake passage 30 downstream of the surge tank 33 is branched into independent passages extending toward the respective cylinders 18, and downstream ends of the independent passages are connected with the intake ports 16 of the cylinders 18, respectively.

An ozone generator ($O_3$ generator) 76 for applying ozone to fresh air to be introduced into the cylinders 18 is provided in the intake passage 30, between the throttle valve 36 and the surge tank 33. The ozone generator 76 produces ozone by silent discharge, using oxygen contained within the intake air as material gas. In other words, by applying a high-frequency alternating current of a high voltage from a power source (not illustrated) to electrodes, the silent discharge is caused in a discharge gap thereof, and air (i.e., intake air) passing therethrough is ozonized. The ozonized intake air as above is introduced from the surge tank 33 into each cylinder 18 via the intake port 16. By changing a mode of applying the voltage to the electrodes of the ozone generator 76 and/or changing the number of the electrodes to which the voltage is applied, an ozone concentration within the intake air after passing through the ozone generator 76 can be adjusted. A powertrain control module (PCM) 10 adjusts the ozone concentration within the intake air to be introduced into the cylinders 18, through the aforementioned control of the ozone generator 76.

An upstream part of the exhaust passage 40 includes an exhaust manifold. The exhaust manifold has independent passages branched toward the respective cylinders 18 and connected with respective external ends of the exhaust ports 17, and a manifold section where the independent passages are collected together. In a part of the exhaust passage 40 downstream of the exhaust manifold, a direct catalyst 41 and an underfoot catalyst 42 are connected as an exhaust emission control system for purifying hazardous components contained within the exhaust gas. Each of the direct catalyst 41 and the underfoot catalyst 42 includes a cylindrical case and, for example, a three-way catalyst disposed in a flow path within the case.

A part of the intake passage 30 between the surge tank 33 and the throttle valve 36 is connected via an EGR passage 50 for recirculating a portion of the exhaust gas back to the intake passage 30, with a part of the exhaust passage 40 upstream of the direct catalyst 41. The EGR passage 50 includes a main passage 51 provided with an EGR cooler 52 for cooling the exhaust gas by an engine coolant. An EGR valve 511 for adjusting a recirculation amount of the exhaust gas to the intake passage 30 is disposed within the main passage 51.

The engine 1 with the configuration described above is controlled by the PCM 10. The PCM 10 is comprised of a microprocessor including a CPU, a memory, a counter timer group, an interface, and paths for connecting these units. The PCM 10 constitutes a controller.

As illustrated in FIGS. 1 and 2, detection signals of various kinds of sensors SW1, SW2, and SW4 to SW21 are inputted to the PCM 10. Specifically, the PCM 10 receives a detection signal of an airflow sensor SW1 for detecting a flow rate of the fresh air on the downstream side of the air cleaner 31, a detection signal of an intake air temperature sensor SW2 for detecting the temperature of the fresh air, a detection signal of an EGR gas temperature sensor SW4 arranged near a connecting part of the EGR passage 50 with the intake passage 30 and for detecting a temperature of external EGR gas, a detection signal of an intake port temperature sensor SW5 attached to the intake port 16 and for detecting the temperature of the intake air immediately before flowing into the cylinder 18, a detection signal of an in-cylinder pressure sensor SW6 attached to the cylinder head 12 and for detecting the pressure inside the cylinder 18, detection signals of an exhaust gas temperature sensor SW7 and an exhaust gas pressure sensor SW8 that are arranged near a connecting part of the exhaust passage 40 with the EGR passage 50 and for detecting the exhaust gas temperature and pressure, respectively, a detection signal of a linear $O_2$ sensor SW9 arranged upstream of the direct catalyst 41 and for detecting an oxygen concentration within the exhaust gas, a detection signal of a lambda $O_2$ sensor SW10 arranged between the direct catalyst 41 and the underfoot catalyst 42 and for detecting the oxygen concentration within the exhaust gas, a detection signal of a fluid temperature sensor SW11 for detecting a temperature of the engine coolant, a detection signal of a crank angle sensor SW12 for detecting a rotational angle of the crankshaft 15, a detection signal of an accelerator position sensor SW13 for detecting an accelerator opening degree corresponding to an angle (operation amount) of an acceleration pedal (not illustrated) of the vehicle, detection signals of intake and exhaust cam angle sensors SW14 and SW15, a detection signal of a fuel pressure sensor SW16 attached to the common rail 64 of the fuel supply system 62 and for detecting the pressure of the fuel supplied to the injector 67, a detection signal of an EGR valve opening sensor SW17 for detecting an opening of the EGR valve 511, a detection signal of an EGR valve pressure difference sensor SW18 for detecting a pressure difference between upstream and downstream positions of the EGR valve 511, a detection signal of a throttle valve opening sensor SW19 for detecting an opening of the throttle valve 36, a detection signal of a throttle valve pressure difference sensor SW20 for detecting a pressure difference between upstream and downstream positions of the throttle valve 36, and a detection signal of an intake air pressure sensor SW21 disposed near the intake ports 16 and for detecting an intake air pressure.

By performing various kinds of operations based on these detection signals, the PCM 10 determines the state of the engine 1, and further, the vehicle, and outputs control signals to the injectors 67, the ignition plugs 25, the VVT 72 and the VVL 74 on the intake side, the VVT 75 and the VVL 71 on the exhaust side, the fuel supply system 62, the actuators of the various kinds of valves (the throttle valve 36 and the EGR valve 511), and the ozone generator 76 according to the determined state. In this manner, the PCM 10 operates the engine 1. Although described in detail later, the PCM 10 may be referred to as the control system of the engine, and functions as a fuel injection controlling module, a variable valve mechanism controlling module, a first in-cylinder state quantity estimating module, and a second in-cylinder state quantity estimating module.

[Operating Range]

Figure 3:
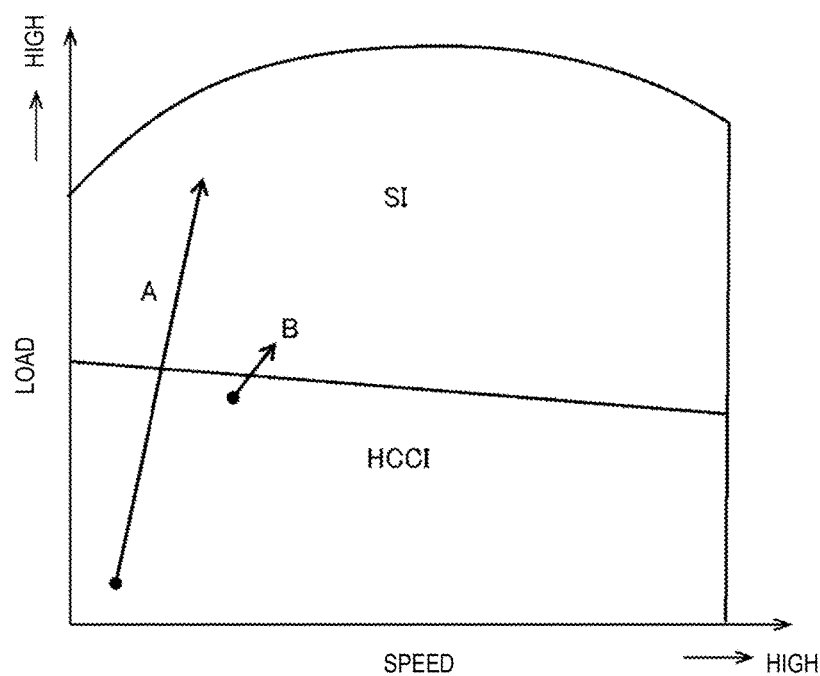
FIG. 3 is a chart illustrating an operating range of the engine according to the embodiment of the present invention.

Next, an operating range of the engine according to this embodiment is described with reference to FIG. 3. FIG. 3 illustrates one example of an operation control map of the engine 1. Within a low engine load range where an engine load is relatively low, the engine 1 performs compression-ignition combustion triggered by pre-mixture compression self-ignition (HCCI) without performing ignition by the ignition plug 25, so as to improve a fuel consumption and exhaust emission performance. However, with the compression-ignition combustion, the speed of the combustion becomes excessively high as the engine load increases, causing a problem of combustion noises, etc. Therefore, with the engine 1, within a high engine load range where the engine load is relatively high, the compression-ignition combustion is suspended and switched to forced ignition combustion using the ignition plug 25 (here, SI combustion). As described above, the engine 1 switches the combustion mode according to the operating state of the engine 1, particularly according to the load of the engine 1, between an HCCI mode where the pre-mixture compression self-ignition combustion is performed and an SI mode where the spark-ignition combustion is performed. Note that the boundary for switching the mode is not limited to the illustrated example.

[Operations of Intake and Exhaust Valves]

Figure 4A:
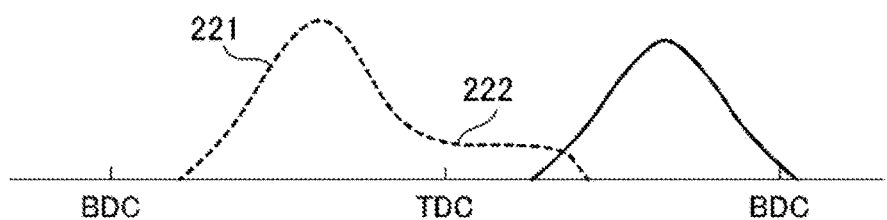
Figure 4B:
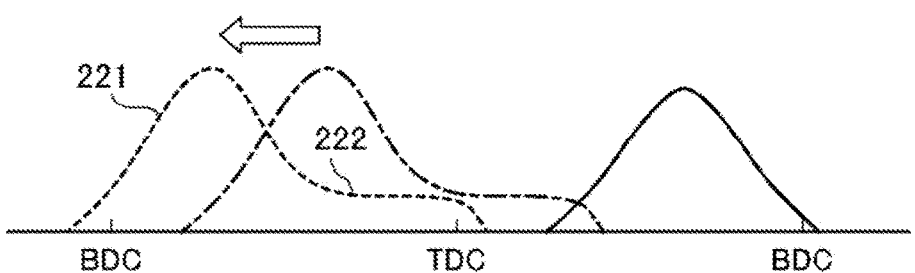
Figure 4C:
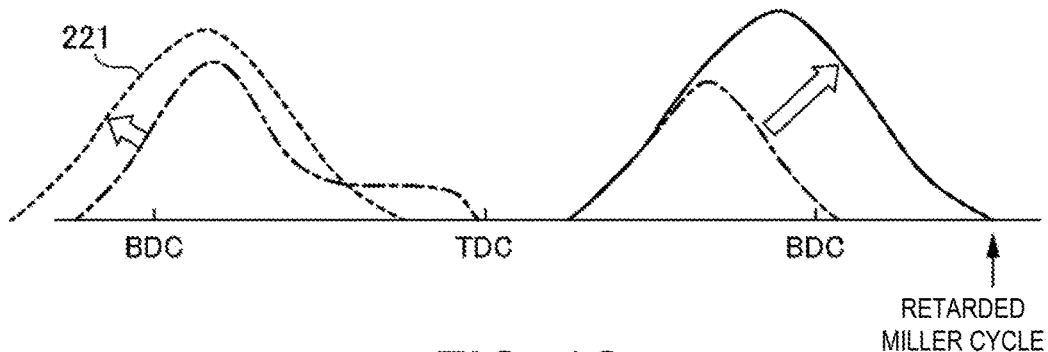

Next, operations of the intake and exhaust valves according to this embodiment are described with reference to FIGS. 4A to 4C. FIGS. 4A to 4C are views illustrating lift curves of the intake and exhaust valves according to the embodiment of the present invention, in which FIG. 4A illustrates lift curves for a low engine load side of an HCCI range of the engine, FIG. 4B illustrates lift curves for a high engine load side of the HCCI range of the engine, and FIG. 4C illustrates lift curves of the intake and exhaust valves within an SI range of the engine.

With the profiles of the cams of the intake-side VVL 74, the low lift cam has a single cam nose with a relatively low lift as illustrated with the solid lines in FIGS. 4A and 4B, and the high lift cam has a single cam nose with a relative high lift as illustrated with the solid line in FIG. 4C.

While the VVL 74 transmits the operating state of the low lift cam to the intake valve 21, as illustrated in FIGS. 4A and 4B, the intake valve 21 opens at a relatively low lift and the open period thereof is short. On the other hand, while the VVL 74 transmits the operating state of the high lift cam to the intake valve 21, as illustrated in FIG. 4C, the intake valve 21 opens at a relatively high lift and the open period thereof is long. In the example of FIGS. 4A to 4C, since the high and low lift cams are designed to switch in a synchronization of their opening timings, while the VVL 74 transmits the operating state of the high lift cam to the intake valve 21, the closing timing of the intake valve 21 is retarded to the compression stroke, and thus, a retarded Miller cycle is achieved.

In the exhaust-side VVL 71, the profile of the second cam has a lift maintaining portion 222 on a closing side of a lift curve as illustrated by the dashed lines in FIGS. 4A and 4B, where the lift is substantially maintained (fixed) over a progression of the crank angle. The profile of the first cam has a single cam nose and has no lift maintaining portion, as illustrated by the dashed line in FIG. 4C.

While the lost motion mechanism of the exhaust-side VVL 71 transmits the operating state of the second cam to the exhaust valve 22, as illustrated by the dashed lines in FIGS. 4A and 4B, the exhaust valve 22 operates in the special mode (first operation mode) where after the exhaust valve 22 opens, the lift gradually increases as the crank angle progresses until at least the lift reaches a predetermined peak on the exhaust stroke, then a predetermined lift is maintained at the lift maintaining portion 222, and the exhaust valve 22 finally closes. On the other hand, while the lost motion mechanism of the exhaust-side VVL 71 transmits the operating state of the first cam to the exhaust valve 22, as illustrated by the dashed line in FIG. 4C, the exhaust valve 22 operates in the normal mode (second operation mode) where after the exhaust valve 22 opens, the lift gradually increases as the crank angle progresses until at least the lift reaches a predetermined peak on the exhaust stroke, and then the lift gradually reduces until the exhaust valve 22 closes. The normal and special modes of the VVL 71 are switched according to the operating state of the engine 1. Specifically, the special mode is applied for introducing internal EGR gas into the cylinder 18, and the normal mode is applied in other situations. In some instances, the processing of operating the VVL 71 in the normal mode may be considered "turning the VVL 71 off," and the processing of operating the VVL 71 in the special mode and performing the internal EGR control may be considered "turning the VVL 71 on."

Next, further detailed description of the profile of the second cam of the exhaust-side VVL 71 is given with reference to FIGS. 4A and 4B. The dashed line in FIG. 4A indicates a lift curve 221 of the exhaust valve 22 when a cam phase of the VVL 71 corresponds to the closing timing of the exhaust valve 22 is retarded the most, and the dashed line in FIG. 4B indicates a lift curve 221 of the exhaust valve 22 when the cam phase of the VVL 71 corresponding to the closing timing of the exhaust valve 22 is advanced the most. As described above, the second cam has the lift maintaining portion 222 on the closing side of the lift curve 221. The term "closing side of the lift curve 221" corresponds to a closing side section of the lift curve 221 when the lift curve 221 is divided into a valve opening side and a valve closing side at the peak thereof. As illustrated in FIG. 4A, when the cam phase of the VVL 71 corresponding to the closing timing of the exhaust valve 22 is retarded the most by the VVT 75, the lift maintaining portion 222 is used in a time range at least including an early stage of the intake stroke. The term "early stage" corresponds to an early stage of the intake stroke when the intake stroke is divided into an early stage and a late stage. Therefore, a portion of the exhaust gas discharged to the exhaust port 17 during the exhaust stroke is returned back into the cylinder 18 by opening the exhaust valve 22 during the intake stroke. Thus, the portion of the exhaust gas substantially remains within the cylinder 18 (i.e., internal EGR control).

The lift maintaining portion 222 is designed to have a lower lift than the peak of the lift curve 221. As illustrated in FIG. 4A, when the cam phase corresponding to the opening and closing timings of the exhaust valve 22 are retarded by the VVT 75, the time range where the lift maintaining portion 222 is used may include the TDC. Therefore, in this embodiment, the lift maintaining portion 222 is designed to have a highest lift possible without interfering with a top surface of the piston 14 at the TDC. In this manner, a largest amount of the internal EGR gas can be designed to be as large as possible. For example, the lift of the lift maintaining portion 222 can be designed suitably within a range of half of the lift of the peak lift of the lift curve 221.

The length of the lift maintaining portion 222 (i.e., the length in a progressing direction of the crank angle) is designed based on the highest lift within the designable range, so as to obtain a largest amount of the internal EGR gas which may be requested.

Note that in the special mode of the exhaust valve 22, instead of the cam profile with which, after the valve opens on the exhaust stroke, it is kept open over the lift maintaining portion 222, and then closes on the intake stroke as illustrated in FIGS. 4A and 4B, a cam profile with which the valve is opened on the exhaust stroke, then closed once, and opened again on the intake stroke, may be adopted.

[Switch Control of Combustion Mode of Engine]

Figure 5:
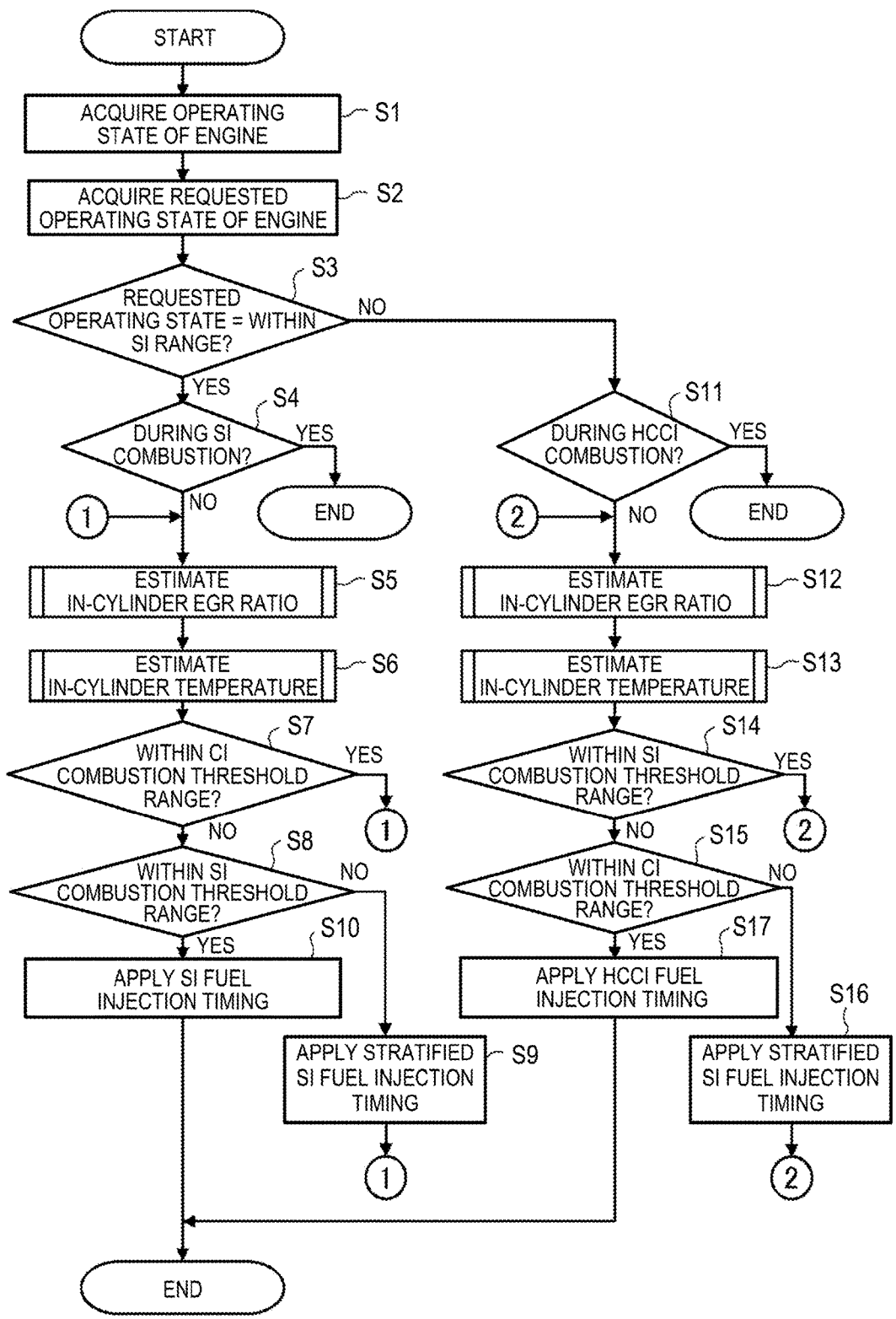
FIG. 5 is a flowchart of a combustion control of the engine according to the embodiment of the present invention.
Figure 6:
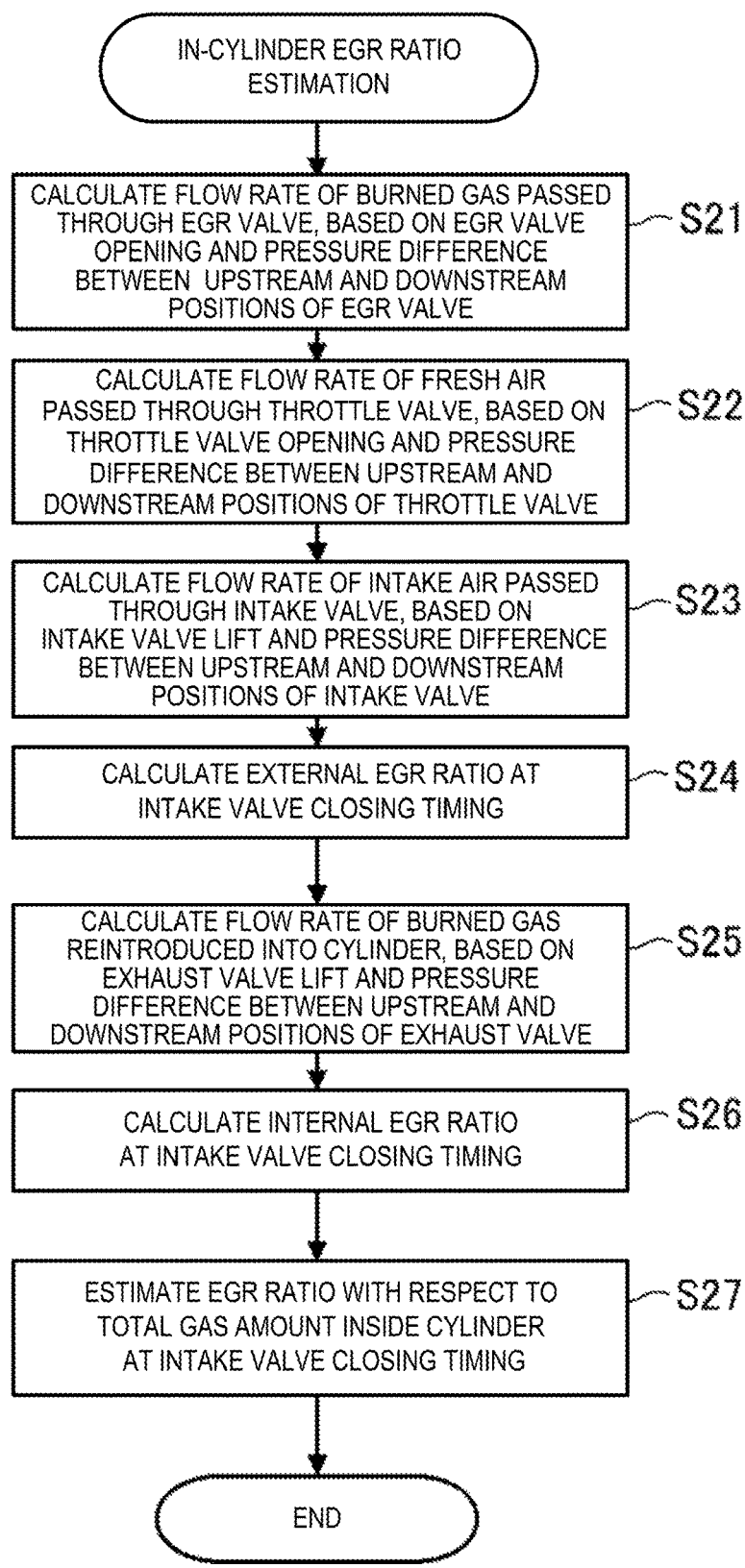
FIG. 6 is a flowchart of an in-cylinder EGR ratio estimation in the combustion control of the engine illustrated in FIG. 5.
Figure 7:
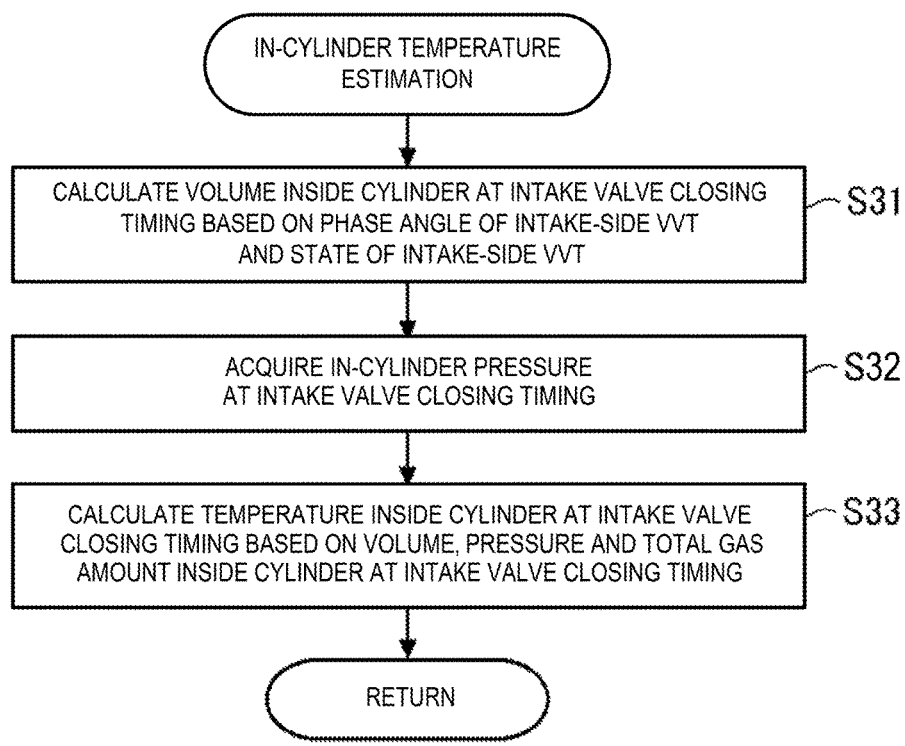
FIG. 7 is a flowchart of an in-cylinder temperature estimation in the combustion control of the engine illustrated in FIG. 5.
Figure 8A:
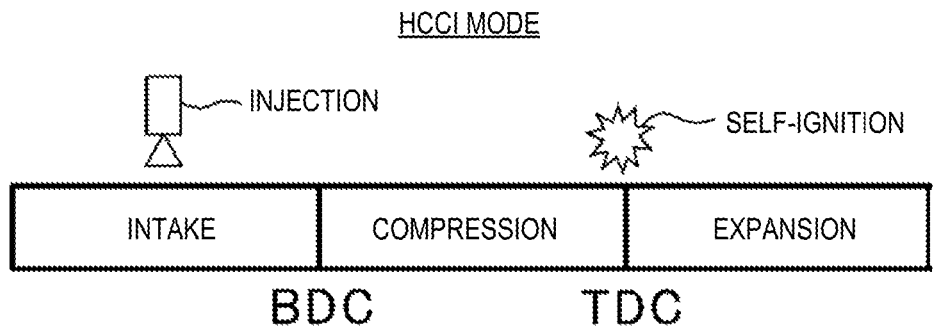
FIGS. 8A to 8C are views schematically illustrating fuel injection timings in HCCI combustion, stratified SI combustion, and SI combustion, respectively.
Figure 8B:
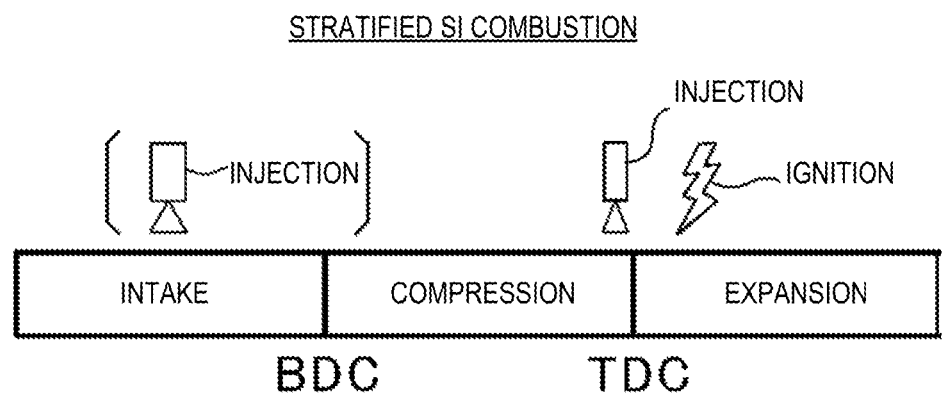
Figure 8C:
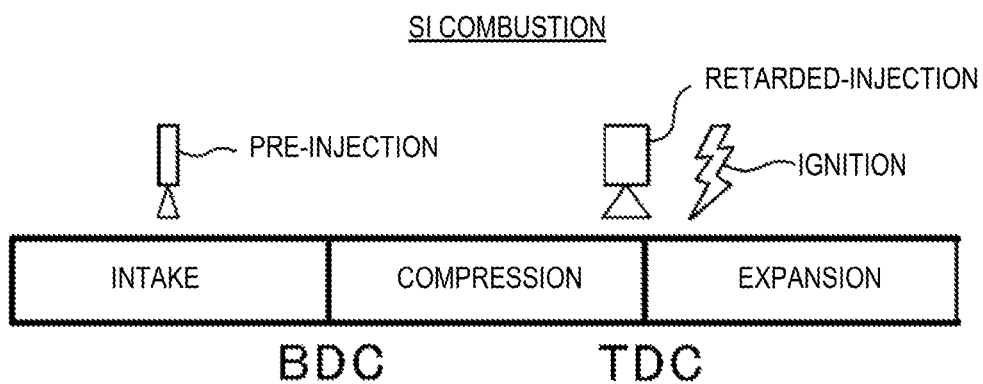

Next, a combustion control of the engine of this embodiment is described with reference to FIGS. 5 to 8. FIG. 5 is a flowchart of the combustion control of the engine according to the embodiment of the present invention. FIG. 6 is a flowchart of an in-cylinder EGR ratio estimation in the combustion control of the engine illustrated in FIG. 5. FIG. 7 is a flowchart of an in-cylinder temperature estimation in the combustion control of the engine illustrated in FIG. 5. FIGS. 8A to 8C are views schematically illustrating fuel injection timings in HCCI combustion, stratified SI combustion, and SI combustion, respectively.

The combustion control illustrated in FIG. 5 is repeated at a predetermined time cycle by the PCM 10 while the vehicle is in operation.

As illustrated in FIG. 5, once the combustion control of the engine 1 is started, first at S1, the PCM 10 acquires the operating state of the engine 1 based on the detection signals inputted from the various sensors, etc.

Next, at S2, the PCM 10 acquires a requested operating state of the engine 1 based on the detection signals inputted from the various sensors, etc. For example, the PCM 10 acquires the requested operating state of the engine 1 based on the accelerator opening inputted from the accelerator position sensor SW13 and the operating state of the engine 1 acquired at S1.

Then at S3, the PCM 10 determines whether or not the requested opening state of the engine 1 acquired at S2 is within the SI range. If the requested opening state of the engine 1 acquired at S2 is within the SI range as a result, the control proceeds to S4 where the PCM 10 determines whether or not the engine 1 is undergoing the SI combustion. If the engine 1 is undergoing the SI combustion as a result, the PCM 10 continues the control for the SI combustion and ends the combustion control.

On the other hand, if the engine 1 is not undergoing the SI combustion, the engine 1 is undergoing the combustion mode switch from the HCCI combustion to the SI combustion. Therefore, the control proceeds to S5 where the PCM 10 performs the in-cylinder EGR ratio estimation in which a ratio of a burned gas amount with respect to a total gas amount introduced into the cylinder 18 of the engine 1, in other words, an EGR ratio, is estimated as a state quantity inside the cylinder 18 (first in-cylinder state quantity).

As illustrated in FIG. 6, once the in-cylinder EGR ratio estimation is started, at S21, the PCM 10 calculates a flow rate of the burned gas passed through the EGR valve 511, based on the opening of the EGR valve 511 inputted from the EGR valve opening sensor SW17 and the pressure difference between the upstream and downstream positions of the EGR valve 511 inputted from the EGR valve pressure difference sensor SW18.

Next, at S22, the PCM 10 calculates a flow rate of fresh air passed through the throttle valve 36 based on the opening of the throttle valve 36 inputted from the throttle valve opening sensor SW19 and the pressure difference between the upstream and downstream positions of the throttle valve 36 inputted from the throttle valve pressure difference sensor SW20.

Then at S23, the PCM 10 estimates the lift of the intake valve 21 based on the cam angle of the intake valve 21 inputted from the intake cam angle sensor SW14, estimates a pressure difference between upstream and downstream positions of the intake valve 21 based on the intake air pressure inputted from the intake air pressure sensor SW21 and the pressure inside the cylinder 18 (in-cylinder pressure) inputted from the in-cylinder pressure sensor SW6, and calculates a flow rate of intake air passed through the intake valve 21 (a mixture gas of burned gas recirculated through the EGR passage 50 and the fresh air) based on the lift of the intake valve 21 and the pressure difference between the upstream and downstream positions of the intake valve 21.

Subsequently at S24, the PCM 10 calculates an external EGR ratio (a ratio of the burned gas recirculated through the EGR passage 50 with respect to the intake air passed through the intake valve 21 (the mixture gas of the burned gas recirculated through the EGR passage 50 and the fresh air)) at the closing timing of the intake valve 21, based on the flow rate of the burned gas passed through the EGR valve 511 and the flow rate of the fresh air passed through the throttle valve 36, and the flow rate of the intake air passed through the intake valve 21.

Next, at S25, the PCM 10 estimates the lift of the exhaust valve 22 based on the cam angle of the exhaust valve 22 inputted from the exhaust cam angle sensor SW15, estimates a pressure difference between upstream and downstream positions of the exhaust valve 22 based on the exhaust air pressure inputted from the exhaust air pressure sensor SW8 and the in-cylinder pressure inputted from the in-cylinder pressure sensor SW6, and calculates a flow rate of burned gas reintroduced into the cylinder 18 by the open-twice control of the exhaust valve 22 during the intake stroke based on the lift of the exhaust valve 22 and the pressure difference between the upstream and downstream positions of the exhaust valve 22.

Then at S26, based on the flow rate of the burned gas reintroduced into the cylinder 18 through the exhaust valve 22 and a total gas amount introduced into the cylinder 18 (a total of an amount of the intake air passed through the intake valve 21 at the flow rate calculated at S23, and an amount of the burned gas reintroduced into the cylinder 18 through the exhaust valve 22 at the flow rate calculated at S25) until the closing timing of the intake valve 21, the PCM 10 calculates an internal EGR ratio (a ratio of the amount of the burned gas reintroduced into the cylinder 18 through the exhaust valve 22 (internal EGR gas amount) with respect to the total gas amount introduced into the cylinder 18) at the closing timing of the intake valve 21.

Subsequently at S27, the PCM 10 estimates the EGR ratio (the ratio of the burned gas amount with respect to the total gas amount introduced into the cylinder 18) at the closing timing of the intake valve 21, based on the external EGR ratio calculated at S24 and the internal EGR ratio calculated at S26. After S27, the PCM 10 ends the in-cylinder EGR ratio estimation and returns to the main routine in FIG. 5.

Returning to FIG. 5, when the in-cylinder EGR ratio estimation at S5 is ended, the control proceeds to S6 where the PCM 10 performs the in-cylinder temperature estimation in which the temperature inside the cylinder 18 of the engine 1 is estimated as a state quantity inside the cylinder 18 (second in-cylinder state quantity).

As illustrated in FIG. 7, once the in-cylinder temperature estimation is started, at S31, the PCM 10 calculates a volume inside the cylinder 18 at the closing timing of the intake valve 21, based on a phase angle of the intake-side VVT 72 and a setting state of the intake-side VVL 74.

Next, at S32, the PCM 10 acquires an in-cylinder pressure at the closing timing of the intake valve 21, based on the in-cylinder pressure inputted from the in-cylinder pressure sensor SW6.

Then at S33, the PCM 10 calculates the temperature inside the cylinder 18 at the closing timing of the intake valve 21 by using an equation of state based on the volume and pressure inside the cylinder 18 at the closing timing of the intake valve 21 and the total gas amount introduced into the cylinder 18 until the closing timing of the intake valve 21. After S33, the PCM 10 ends the in-cylinder temperature estimation and returns to the main routine in FIG. 5.

Returning to FIG. 5, when the in-cylinder temperature estimation at S6 is ended, the control proceeds to S7 where the PCM 10 determines whether or not the EGR ratio inside the cylinder 18 estimated at S5 and the temperature inside the cylinder 18 estimated at S6 are respectively within a CI combustion threshold range where compression self-ignition (Compression Ignition: CI) combustion can be performed. The CI combustion threshold range is a range where the CI combustion can stably be performed, and is designed as a predetermined range defined by a lower limit value and an upper limit value, based on, for example, a result of a test conducted on the engine 1.

If the EGR ratio and temperature inside the cylinder 18 are respectively within the CI combustion threshold range as a result, the inside of the cylinder 18 is in the state where the CI combustion can stably be performed. Therefore, the HCCI combustion is continued. Then, the processes at S5 and S6 are repeated until one of the EGR ratio and temperature inside the cylinder 18 reaches a value outside the CI combustion threshold range.

In the case of performing the HCCI combustion, as illustrated in FIG. 8A, the fuel injection timing is designed within a period at least from the intake stroke to a middle stage of the compression stroke. By injecting the fuel from the injector 67 into the cylinder 18 within this period, homogeneous mixture gas is formed. The mixture gas is compressed to self-ignite near the CTDC.

On the other hand, if at least one of the EGR ratio and temperature inside the cylinder 18 is outside the CI combustion threshold range, the control proceeds to S8 where the PCM 10 determines whether or not the EGR ratio and temperature inside the cylinder 18 estimated at S5 and S6 are respectively within an SI combustion threshold range. The SI combustion threshold range is a range where the SI combustion can stably be performed, and is designed as a predetermined range defined by a lower limit value and an upper limit value, based on, for example, a result of a test conducted on the engine 1.

If at least one of the EGR ratio and temperature inside the cylinder 18 is outside the SI combustion threshold range as a result, the inside of the cylinder 18 is in a transition state where neither the CI combustion nor the SI combustion can stably be performed. Therefore, the control proceeds to S9 where the PCM 10 switches the fuel injection timing to a timing associated with the stratified SI combustion. Then, the PCM 10 returns to S5.

In the case of performing the stratified SI combustion, as illustrated in FIG. 8B, the fuel injection timing is designed to be a timing immediately before an ignition timing near the CTDC. By injecting the fuel from the injector 67 into the cylinder 18 at this timing, stratified mixture gas is formed to concentrate around the ignition plug 25. Further, by igniting the stratified mixture gas to combust, even if the cylinder 18 is in the transition state where neither the CI combustion nor the SI combustion can stably be performed, the stratified mixture gas can be combusted by the spark-ignition, and the combustion can be stabilized. Further, even if the fuel is injected at a fuel injection timing associated with the HCCI combustion (i.e., within a period from the intake stroke to the middle stage of the compression stroke) and pre-mixture gas is formed immediately before the switch of the fuel injection timing, by assisting the self-ignition of the pre-mixture gas with spark-ignition combustion of the stratified mixture gas formed around the ignition plug 25, the combustion can be prevented from becoming unstable.

On the other hand, if the EGR ratio and temperature inside the cylinder 18 are determined to be respectively within the SI combustion threshold range at S8, the inside of the cylinder 18 is in the state where the SI combustion can stably be performed. Therefore, the control proceeds to S10 where the PCM 10 switches the fuel injection timing to a timing associated with the SI combustion. Then the PCM 10 ends the combustion control.

In the case of performing the SI combustion, as illustrated in FIG. 8C, the fuel injection timing is designed to be during the intake stroke and in a period from a late stage of the compression stroke to an early stage of expansion stroke (retarded period). By dividing the fuel injection to inject the fuel during the intake stroke (pre-injection) and inject the fuel into the cylinder 18 at a high pressure within the retarded period (retarded injection) as above, the ignition timing can be advanced while suppressing knocking.

Further, at S3 in FIG. 5, if the requested operating state of the engine 1 is outside the SI range (i.e., within the HCCI range), the control proceeds to S11 where the PCM 10 determines whether or not the engine 1 is undergoing the HCCI combustion. If the engine 1 is undergoing the HCCI combustion as a result, the PCM 10 continues the control for the HCCI combustion and ends the combustion control.

On the other hand, if the engine 1 is not during the HCCI combustion, the engine 1 is undergoing the combustion mode switch from the SI combustion to the HCCI combustion. Therefore, the control proceeds to S12 where the PCM 10 performs the in-cylinder EGR ratio estimation in which the ratio of the burned gas amount with respect to the total gas amount introduced into the cylinder 18 of the engine 1 (in other words, the EGR ratio), is estimated as the first in-cylinder state quantity.

When the in-cylinder EGR ratio estimation at S12 is ended, the control proceeds to S13 where the PCM 10 performs the in-cylinder temperature estimation in which the temperature inside the cylinder 18 of the engine 1 is estimated as the second in-cylinder state quantity.

When the in-cylinder temperature estimation at S13 is ended, the control proceeds to S14 where the PCM 10 determines whether or not the EGR ratio and temperature inside the cylinder 18 estimated at S12 and S13, respectively, are respectively within the SI combustion threshold range where the SI combustion can be performed.

If the EGR ratio and temperature inside the cylinder 18 are respectively within the SI combustion threshold range as a result, the inside of the cylinder 18 is in the state where the SI combustion can stably be performed. Therefore, the SI combustion is continued. Then, the processes at S12 and S13 are repeated until one of the EGR ratio and temperature inside the cylinder 18 reaches a value outside the CI combustion threshold range.

On the other hand, if at least one of the EGR ratio and temperature inside the cylinder 18 is outside the SI combustion threshold range, the control proceeds to S15 where the PCM 10 determines whether or not the EGR ratio and temperature inside the cylinder 18 estimated at S12 and S13 are respectively within the CI combustion threshold range where the CI combustion can be performed.

If at least one of the EGR ratio and temperature inside the cylinder 18 is outside the CI combustion threshold range as a result, the inside of the cylinder 18 is in the transition state where neither the CI combustion nor the SI combustion can stably be performed. Therefore, the control proceeds to S16 where the PCM 10 switches the fuel injection timing to the timing associated with the stratified SI combustion. Then, the PCM 10 returns to S12.

On the other hand, if the EGR ratio and temperature inside the cylinder 18 are respectively within the CI combustion threshold range, the inside of the cylinder 18 is in the state where the CI combustion can stably be performed. Therefore, the control proceeds to S17 where the PCM 10 switches the fuel injection timing to the timing associated with the HCCI combustion. Then, the PCM 10 ends the combustion control.

Figure 9:
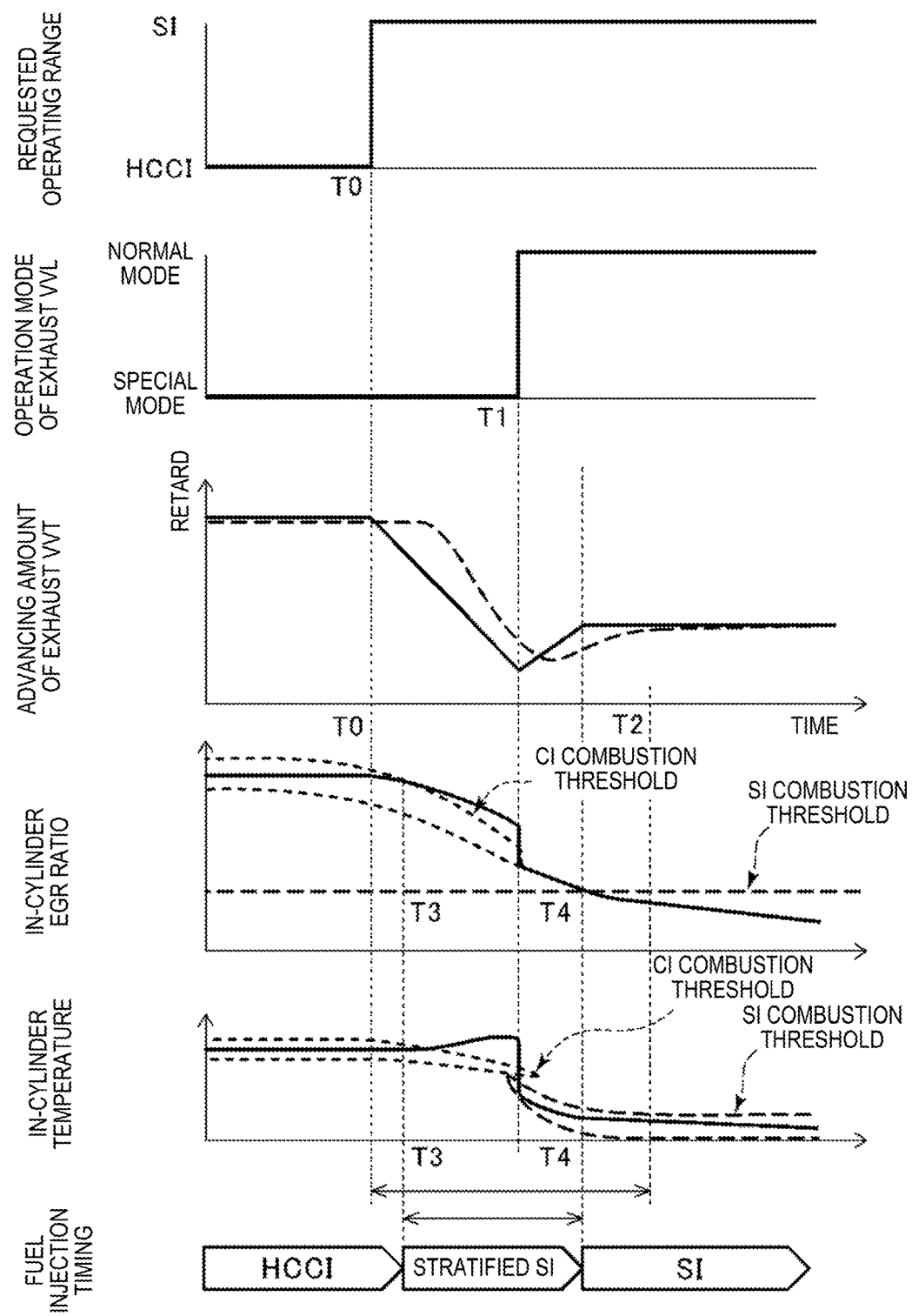
FIG. 9 shows time charts illustrating a relationship between in-cylinder state quantities and the fuel injection timing when the operating range of the engine is switched from a low engine load segment of the HCCI range to the SI range, according to the embodiment of the present invention.
Figure 10:
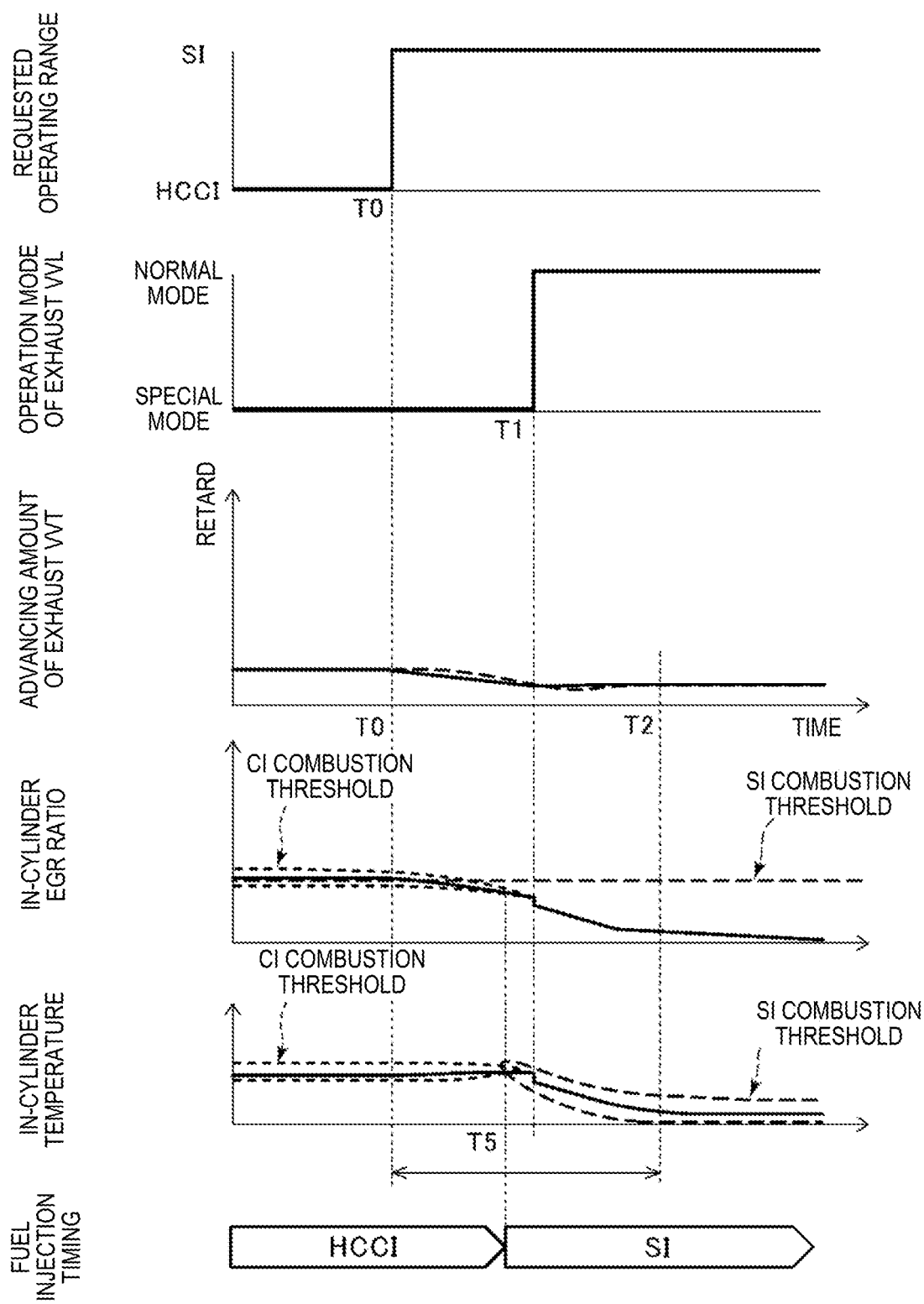
FIG. 10 shows time charts illustrating a relationship between the in-cylinder state quantities and the fuel injection timing when the operating range of the engine is switched from a high engine load segment of the HCCI range to the SI range, according to the embodiment of the present invention.

Next, a relationship between the in-cylinder state quantities and the fuel injection timing when the operating range of the engine 1 is switched from the HCCI range to the SI range is described with reference to FIGS. 9 and 10. FIG. 9 shows time charts illustrating a relationship between the in-cylinder state quantities and the fuel injection timing when the operating range of the engine is switched from a low engine load segment of the HCCI range to the SI range, according to the embodiment of the present invention. FIG. 10 shows time charts illustrating a relationship between the in-cylinder state quantities and the fuel injection timing when the operating range of the engine is switched from a high engine load segment of the HCCI range to the SI range, according to the embodiment of the present invention.

As indicated by the arrow A in FIG. 3, in a case where the operating range of the engine 1 is switched from the low engine load segment of the HCCI range to the SI range (e.g., in a case where a vehicle operator steps onto an accelerator pedal while the operating state of the engine 1 is within the low engine load segment of the HCCI range, and thus a request load on the engine 1 is sharply increased and the operating range of the engine 1 is shifted from the HCCI range to the SI range), the operation modes of the intake and exhaust valves 21 and 22 are required to respectively be switched from the state illustrated in FIG. 4A to the state illustrated in FIG. 4C, which requires a comparatively long period of time, and causes a great change of the state inside the cylinder 18.

Specifically, as illustrated in FIG. 9, once the operating range of the engine 1 is switched from the HCCI range to the SI range at a time point T0, the PCM 10 instructs the exhaust-side VVL 71 to switch the operation mode and advances the cam phase corresponding to the closing timing of the exhaust valve 22 by the VVT 75.

After a predetermined response lag, the operation mode of the VVL 71 is switched from the special mode to the normal mode at a time point T1. Further, the advancement amount of the phase corresponding to the closing timing of the exhaust valve 22 changes following the instruction value (indicated by the solid line in FIG. 9) with a time delay (indicated by the dashed line in FIG. 9), and reaches a target value at a time point T2.

Immediately after the switch of the operating range of the engine 1 from the HCCI range to the SI range (until a time point T3 in FIG. 9), since the operation mode of the VVL 71 does not switch and the advancement amount of the exhaust valve 22 changes only slightly, the in-cylinder EGR ratio and the in-cylinder temperature estimated in the combustion control of FIG. 5 (both indicated by the solid lines in FIG. 9) remain within the CI combustion threshold range (indicated by the dashed lines in FIG. 9). Therefore, the PCM 10 continues the HCCI combustion.

After the time point T3, the in-cylinder EGR ratio and the in-cylinder temperature reach outside the CI combustion threshold range and are also not within the SI combustion threshold range (indicated by the long dashed lines in FIG. 9). Therefore, the PCM 10 switches the fuel injection timing to the timing associated with the stratified SI combustion.

Once the operation mode of the VVL 71 is switched from the special mode to the normal mode at the time point T1, the burned gas is no longer reintroduced into the cylinder 18 during the intake stroke by the open-twice control of the exhaust valve 22, and thus, both of the in-cylinder EGR ratio and the in-cylinder temperature drop sharply. Thereby, the in-cylinder temperature reaches a value inside the SI combustion threshold range; however, the advancement amount of the phase corresponding to the closing timing of the exhaust valve 22 still has not reached the target value, and the in-cylinder EGR ratio is outside the SI combustion threshold range. Therefore, the PCM 10 continues the stratified SI combustion.

Moreover, at a time point T4, although the advancement amount of the phase corresponding to the closing timing of the exhaust valve 22 still has not reached the target value, the in-cylinder EGR ratio and the in-cylinder temperature are both within the SI combustion threshold range. Therefore, the PCM 10 switches the fuel injection timing to the timing associated with the SI combustion. Then, the advancement amount of the phase corresponding to the closing timing of the exhaust valve 22 reaches the target value at the time point T2, and the switch of the combustion mode of the engine 1 is completed.

As described above, since the stratified SI combustion is performed only within the period from the time point T3 to the time point T4 in which the in-cylinder EGR ratio and the in-cylinder temperature are outside the CI and SI combustion threshold ranges, the period of time in which the stratified SI combustion is performed can be shortened compared to a conventional case where the stratified SI combustion is performed in the period from the time point T0 to the time point T2 corresponding to a period from the switch of the operating range of the engine 1 from the HCCI range to the SI range until the advancement amount of the phase corresponding to the closing timing of the exhaust valve 22 reaches the target value and the switch of the combustion mode of the engine 1 is completed. Thus, the degradation of the emission performance and the fuel consumption can be suppressed.

On the other hand, as indicated by the arrow B in FIG. 3, in a case where the operating range of the engine 1 is switched from the high engine load segment of the HCCI range to the SI range (e.g., in a case where the vehicle operator gradually steps onto the accelerator pedal while the operating state of the engine 1 is within the high engine load segment of the HCCI range, and thus the request load on the engine 1 is gently increased and the operating range of the engine 1 is shifted from the HCCI range to the SI range), the operation modes of the intake and exhaust valves 21 and 22 are required to respectively be switched from the state illustrated in FIG. 4B to the state illustrated in FIG. 4C. Therefore, the switch of the operation requires a comparatively short period of time and the state inside the cylinder 18 does not greatly change.

Specifically, as illustrated in FIG. 10, once the operating range of the engine 1 is switched from the HCCI range to the SI range at the time point T0, the PCM 10 instructs the exhaust-side VVL 71 to switch the operation mode and advances the cam phase corresponding to the closing timing of the exhaust valve 22 by the VVT 75.

After a predetermined response lag, the operation mode of the VVL 71 is switched from the special mode to the normal mode at the time point T1. Further, the advancement amount of the phase corresponding to the closing timing of the exhaust valve 22 changes following the instruction value (indicated by the solid line in FIG. 10) with a time delay (indicated by the dashed line in FIG. 10), and reaches a target value at the time point T2. Here, the change amount of the phase to reach the target value is small.

Since the operation mode of the VVL 71 does not switch and the advancement amount of the exhaust valve 22 changes only slightly even after the switch of the operating range of the engine 1 from the HCCI range to the SI range, the in-cylinder EGR ratio and the in-cylinder temperature estimated in the combustion control of FIG. 5 (both indicated by the solid lines in FIG. 10) remain within the CI combustion threshold range (indicated by the dashed lines in FIG. 10) until the time point T5. Therefore, the PCM 10 continues the HCCI combustion. Note that the in-cylinder EGR ratio also reaches a ratio inside the SI combustion threshold range (indicated by the long dashed lines in FIG. 10) immediately after the switch of the operating range of the engine 1 from the HCCI range to the SI range.

After the time point T5, the in-cylinder temperature reaches a temperature outside the CI combustion threshold range to enter the SI combustion threshold range. Moreover, as described above, the in-cylinder EGR ratio is already within the SI combustion threshold range. Therefore, the PCM 10 switches the fuel injection timing to the timing associated with the SI combustion. Then, the advancement amount of the phase corresponding to the closing timing of the exhaust valve 22 reaches the target value at the time point T2, and the switch of the combustion mode of the engine 1 is completed.

As described above, when the change of the state inside the cylinder 18 is small around the switch between the HCCI combustion and the SI combustion and the cylinder 18 is in the state where one of the HCCI combustion and the SI combustion can stably be performed even during the transition period for the combustion mode switch, the combustion mode is switched without performing the stratified SI combustion in the process. Therefore, the degradation of the emission performance and the fuel consumption can significantly be suppressed compared to the conventional case where the stratified SI combustion is performed in the period from the time point T0 to the time point T2 corresponding to the period from the switch of the operating range of the engine 1 from the HCCI range to the SI range until the advancement amount of the phase corresponding to the closing timing of the exhaust valve 22 reaches the target value and the switch of the combustion mode of the engine 1 is completed.

Next, modifications of this embodiment are described.

In the above embodiment, the VVL 71 is hydraulically operated and includes the two kinds of cams with different profiles in which the first cam has one cam nose and the second cam has two cam noses, and the lost motion mechanism for selectively transmitting the operating state of one of the first and second cams to the exhaust valve 22; however, a VVL having a different configuration may be used, and an electromagnetically-driven or pneumatically-driven VVL may be used.

Further, in the above embodiment, when at least one of the EGR ratio and the temperature inside the cylinder 18 are respectively in the transition state where neither of the CI combustion nor the SI combustion can stably be performed, the PCM 10 switches the fuel injection timing to the timing associated with the stratified SI combustion; however, a combustion mode different from the stratified SI combustion may be adopted as long as the combustion can stably be performed in this combustion mode even in such a transition state inside the cylinder 18.

Next, operations and effects of the control system of the engine 1 of the above embodiment and modifications thereof are described.

First, when the operating state of the engine 1 is switched between the SI range and the CI range, the PCM 10 controls the fuel injection timing based on the state quantity relating to the burned gas amount inside the cylinder 18. Therefore, the fuel injection timing suitable for the burned gas amount inside the cylinder 18 which correlates with the combustion stability can be applied, and thus, when switching the combustion mode of the engine 1 between the CI combustion and the SI combustion, the unstable combustion can be prevented while suppressing the degradation of the emission performance and the fuel consumption.

When the operating state of the engine 1 is switched from the CI range to the SI range, if the inside of the cylinder 18 is in the state where the SI combustion cannot stably be performed, the PCM 10 applies the fuel injection timing associated with the stratified SI combustion. Therefore, the period in which the stratified SI combustion is performed can be limited to a necessary length, and thus, when switching the combustion mode of the engine 1 from the CI combustion to the SI combustion, the unstable combustion can be prevented while suppressing the degradation of the emission performance and the fuel consumption.

When the operating state of the engine 1 is switched from the CI range to the SI range, if the inside of the cylinder 18 is in the state where the CI combustion can be performed, the PCM 10 continues the CI combustion. Therefore, the period in which the stratified SI combustion is performed can securely be limited to a necessary length, and thus, when switching the combustion mode of the engine 1 from the CI combustion to the SI combustion, the unstable combustion can be prevented while suppressing the degradation of the emission performance and the fuel consumption.

The PCM 10 estimates the in-cylinder state also during the stratified SI combustion and shifts the combustion mode to the SI combustion once the inside of the cylinder 18 reaches the state where the SI combustion can stably be performed. Therefore, the period in which the stratified SI combustion is performed can securely be limited to a necessary length, and thus, when switching the combustion mode of the engine 1 from the CI combustion to the SI combustion, the unstable combustion can be prevented while suppressing the degradation of the emission performance and the fuel consumption.

When the operating state of the engine 1 is switched from the SI range to the CI range, if the inside of the cylinder 18 is in the state where the CI combustion cannot stably be performed, the PCM 10 applies the fuel injection timing associated with the stratified SI combustion. Therefore, the period in which the stratified SI combustion is performed can be limited to a necessary length, and thus, when switching the combustion mode of the engine 1 from the SI combustion to the CI combustion, the unstable combustion can be prevented while suppressing the degradation of the emission performance and the fuel consumption.

When the operating state of the engine 1 is switched between the SI range and the CI range, the PCM 10 controls the fuel injection timing based on the state quantity relating to the temperature inside the cylinder 18. Therefore, the fuel injection timing suitable for the temperature inside the cylinder 18 which correlates with the combustion stability can be applied, and thus, when switching the combustion mode of the engine 1 between the CI combustion and the SI combustion, the unstable combustion can more securely be prevented while suppressing the degradation of the emission performance and the fuel consumption more effectively.

When the operating state of the engine 1 is switched between the SI range and the CI range, the PCM 10 controls the fuel injection timing based on the EGR ratio (i.e., the ratio of the burned gas amount with respect to the total gas amount introduced into the cylinder 18 of the engine 1). Therefore, a more suitable fuel injection timing can be applied, and thus, when switching the combustion mode of the engine 1 between the CI combustion and the SI combustion, the unstable combustion can more securely be prevented while suppressing the degradation of the emission performance and the fuel consumption more effectively.

The PCM 10 calculates the EGR ratio at the closing timing of the intake valve 21 based on the external and internal EGR ratios at the closing timing of the intake valve 21. Therefore, the EGR ratio at the closing timing of the intake valve 21 can be estimated more accurately, and thus, when switching the combustion mode of the engine 1 between the CI combustion and the SI combustion, the unstable combustion can more securely be prevented while suppressing the degradation of the emission performance and the fuel consumption more effectively.

The PCM 10 calculates the temperature inside the cylinder 18 at the closing timing of the intake valve 21 based on the volume and pressure inside the cylinder 18 at the closing timing of the intake valve 21 and the total gas amount introduced into the cylinder 18 until the closing timing of the intake valve 21. Therefore, the temperature inside the cylinder 18 of the engine 1 can be estimated more accurately, and thus, when switching the combustion mode of the engine 1 between the CI combustion and the SI combustion, the unstable combustion can more securely be prevented while suppressing the degradation of the emission performance and the fuel consumption more effectively.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
10 PCM
16 Intake Port
17 Exhaust port
18 Cylinder
22 Exhaust Valve
71 VVL (Exhaust Side)
74 VVL (Intake Side)
75 VVT (Exhaust Side)

The invention claimed is:

1. A control system of an engine where compression ignition combustion is performed when an operating state of the engine is within a predetermined compression ignition range, and spark-ignition combustion is performed when the operating state of the engine is within a predetermined spark-ignition range, the control system comprising:
 a processor operatively coupled to an exhaust variable valve mechanism and a plurality of sensors; and
 a memory storing a plurality of modules to be executed by the processor, the plurality of modules comprising:
  a fuel injection controlling module for controlling a fuel injector of the engine to inject a fuel at a fuel injection timing associated with the operating state of the engine;
  a variable valve mechanism controlling module for operating an exhaust valve via the exhaust variable valve mechanism in a first operation mode when the operating state of the engine is within the predetermined compression ignition range, said first operation mode being defined by an opening of the exhaust valve on an intake stroke so as to reintroduce an amount of burned gas into a cylinder from an exhaust port of the engine, and operating the exhaust valve via the exhaust variable valve mechanism in a second operation mode when the operating state of the engine is within the predetermined spark-ignition range, said second operation mode being defined by a closing of the exhaust valve such that a closing timing of the exhaust valve in the second operation mode is advanced from a closing timing of the exhaust valve in the first operation mode; and
  a first in-cylinder state quantity estimating module for estimating, based on signals from the plurality of sensors, a first state quantity inside the cylinder, wherein the first state quantity is defined as an in-cylinder EGR ratio estimation, said in-cylinder EGR ratio estimation being based on each of an external EGR ratio and an internal EGR ratio, such that the external EGR ratio is calculated as a ratio of burned gas recirculated through an EGR passage with respect to fresh air passed through a throttle valve and intake air passed through an intake valve, and the internal EGR ratio is calculated as a ratio of the amount of burned gas reintroduced into the cylinder from the exhaust port of the engine with respect to a total gas amount introduced into the cylinder;
 wherein when the operating state of the engine is switched between the predetermined spark-ignition range and the predetermined compression ignition range, the fuel injection controlling module adjusts the fuel injection timing so as not to form and ignite stratified mixture gas around an ignition plug of the engine when the first state quantity has exceeded a predetermined threshold value, and the fuel injection controlling module adjusts the fuel injection timing so as to form and ignite stratified mixture gas around the ignition plug of the engine when the first state quantity has not exceeded the predetermined threshold value.

2. The control system of claim 1, wherein when the operating state of the engine is switched from the predetermined compression ignition range to the predetermined spark-ignition range, when the first state quantity inside the cylinder is within a predetermined spark-ignition combustion threshold range where the spark-ignition combustion is performable, the fuel injection controlling module applies a fuel injection timing associated with stratified spark-ignition combustion, said stratified spark-ignition combustion performed by forming substantially uniform pre-mixture gas inside the cylinder on the intake stroke, then injecting the fuel on a compression stroke so as to form stratified mixture gas around the ignition plug of the engine, and then spark-igniting the stratified mixture gas so as to combust the stratified mixture gas along with the pre-mixture gas.

3. The control system of claim 1, wherein when the operating state of the engine is switched from the predetermined spark-ignition range to the predetermined compression ignition range, when the first state quantity inside the cylinder is within a predetermined compression ignition combustion threshold range where the compression ignition combustion is performable, the fuel injection controlling module applies a fuel injection timing associated with the compression ignition combustion, and when the first state quantity inside the cylinder is outside the predetermined compression ignition combustion threshold range, the fuel injection controlling module applies a fuel injection timing associated with stratified spark-ignition combustion, said stratified spark-ignition combustion performed by forming substantially uniform pre-mixture gas inside the cylinder on the intake stroke, then injecting the fuel on a compression stroke so as to form stratified mixture gas around the ignition plug of the engine, and then spark-igniting the stratified mixture gas so as to combust the stratified mixture gas along with the pre-mixture gas.

4. The control system of claim 1, further comprising a second in-cylinder state quantity estimating module for estimating, based on signals from the plurality of sensors, a second state quantity inside the cylinder, said second state quantity relating to a temperature inside the cylinder,
wherein when the operating state of the engine is switched between the predetermined spark-ignition range and the predetermined compression ignition range, the fuel injection controlling module adjusts the fuel injection timing based on each of the first state quantity inside the cylinder estimated by the first in-cylinder state quantity estimating module and the second state quantity inside the cylinder estimated by the second in-cylinder state quantity estimating module.

5. The control system of claim 2, wherein when the first state quantity inside the cylinder is outside the predetermined spark-ignition combustion threshold range and is within a predetermined compression ignition combustion threshold range where the compression ignition combustion is performable, the fuel injection controlling module applies a fuel injection timing associated with the compression ignition combustion.

6. The control system of claim 5, wherein while the fuel injection timing associated with the stratified spark-ignition combustion is applied, when the first state quantity inside the cylinder reaches a value inside the predetermined spark-ignition combustion threshold range, the fuel injection controlling module switches the fuel injection timing to the fuel injection timing associated with the spark-ignition combustion.

7. The control system of claim 5, wherein when the operating state of the engine is switched from the predetermined spark-ignition range to the predetermined compression ignition range, when the first state quantity inside the cylinder is within the predetermined compression ignition combustion threshold range where the compression ignition combustion is performable, the fuel injection controlling module applies the fuel injection timing associated with the compression ignition combustion, and when the first state quantity inside the cylinder is outside the predetermined compression ignition combustion threshold range, the fuel injection controlling module applies the fuel injection timing associated with the stratified spark-ignition combustion.

8. The control system of claim 5, further comprising a second in-cylinder state quantity estimating module for estimating, based on signals from the plurality of sensors, a second state quantity inside the cylinder, said second state quantity relating to a temperature inside the cylinder,
wherein when the operating state of the engine is switched between the predetermined spark-ignition range and the predetermined compression ignition range, the fuel injection controlling module adjusts the fuel injection timing based on each of the first state quantity inside the cylinder estimated by the first in-cylinder state quantity estimating module and the second state quantity inside the cylinder estimated by the second in-cylinder state quantity estimating module.

9. The control system of claim 2, wherein while the fuel injection timing associated with the stratified spark-ignition combustion is applied, when the first state quantity inside the cylinder reaches a value inside the predetermined spark-ignition combustion threshold range, the fuel injection controlling module switches the fuel injection timing to the fuel injection timing associated with the spark-ignition combustion.

10. The control system of claim 3, further comprising a second in-cylinder state quantity estimating module for estimating, based on signals from the plurality of sensors, a second state quantity inside the cylinder, said second state quantity relating to a temperature inside the cylinder,
wherein when the operating state of the engine is switched between the predetermined spark-ignition range and the predetermined compression ignition range, the fuel injection controlling module adjusts the fuel injection timing based on each of the first state quantity inside the cylinder estimated by the first in-cylinder state quantity estimating module and the second state quantity inside the cylinder estimated by the second in-cylinder state quantity estimating module.

11. A method for controlling an engine where compression ignition combustion is performed when an operating state of the engine is within a predetermined compression ignition range, and spark-ignition combustion is performed when the operating state of the engine is within a predetermined spark-ignition range, the engine being operatively coupled to an exhaust variable valve mechanism, the method comprising:
controlling a fuel injector of the engine to inject a fuel at a fuel injection timing associated with the operating state of the engine;
operating an exhaust valve via the exhaust variable valve mechanism in a first operation mode when the operating state of the engine is within the predetermined compression ignition range, said first operation mode being defined by an opening of the exhaust valve on an intake stroke so as to reintroduce an amount of burned gas into a cylinder from an exhaust port of the engine, and operating the exhaust valve via the exhaust variable valve mechanism in a second operation mode when the operating state of the engine is within the predetermined spark-ignition range, said second operation mode being defined by a closing of the exhaust valve such that a closing timing of the exhaust valve in the second operation mode is advanced from a closing timing of the exhaust valve in the first operation mode; and
estimating a first state quantity inside the cylinder, wherein the first state quantity is defined as an in-cylinder EGR ratio estimation, said in-cylinder EGR ratio estimation being based on each of an external EGR ratio and an internal EGR ratio, such that the external EGR ratio is calculated as a ratio of burned gas recirculated through an EGR passage with respect to fresh air passed through a throttle valve and intake air passed through an intake valve, and the internal EGR ratio is calculated as a ratio of the amount of burned gas reintroduced into the cylinder from the exhaust port of the engine with respect to a total gas amount introduced into the cylinder;
wherein when the operating state of the engine is switched from the predetermined compression ignition range to the predetermined spark-ignition range, compression ignition combustion is continued until the first state quantity inside the cylinder is outside the predetermined compression ignition range, whereupon the compression ignition combustion is switched to stratified spark-ignition combustion, whereupon the stratified spark-ignition combustion is continued until the first state quantity inside the cylinder is within the spark-ignition range, whereupon the stratified spark-ignition combustion is then switched to spark-ignition combustion.

12. A control system of an engine where compression ignition combustion is performed when an operating state of the engine is within a predetermined compression ignition range, and spark-ignition combustion is performed when the operating state of the engine is within a predetermined spark-ignition range, the control system comprising:
  a processor operatively coupled to an exhaust variable valve mechanism and a plurality of sensors; and
  a memory storing a plurality of modules to be executed by the processor, the plurality of modules comprising:
    a variable valve mechanism controlling module for operating an exhaust valve via the exhaust variable valve mechanism in a first operation mode when the operating state of the engine is within the predetermined compression ignition range, said first operation mode being defined by an opening of the exhaust valve on an intake stroke so as to reintroduce an amount of burned gas into a cylinder from an exhaust port of the engine, and operating the exhaust valve via the exhaust variable valve mechanism in a second operation mode when the operating state of the engine is within the predetermined spark-ignition range, said second operation mode being defined by a closing of the exhaust valve such that a closing timing of the exhaust valve in the second operation mode is advanced from a closing timing of the exhaust valve in the first operation mode;
    a fuel injection controlling module for controlling a fuel injector of the engine to inject a fuel at a fuel injection timing associated with the operating state of the engine, wherein the fuel injection controlling module controls the fuel injection to be performed on the intake stroke during the compression ignition combustion, controls the fuel injection to be performed near a compression top dead center during stratified spark ignition combustion, and controls the fuel injection to be performed during both the intake stroke and a period from a late stage of a compression stroke to an early stage of an expansion stroke during spark-ignition combustion;
    a spark ignition controlling module for controlling an ignition plug, said ignition plug configured to forcibly ignite a mixture gas, wherein the spark ignition controlling module does not control the ignition plug to forcibly ignite the mixture gas during the compression ignition combustion, and controls the ignition plug to forcibly ignite the mixture gas after the compression top dead center during stratified ignition combustion, and controls the ignition plug to forcibly ignite the mixture gas after the compression top dead center during the spark-ignition combustion; and
    a first in-cylinder state quantity estimating module for estimating, based on signals from the plurality of sensors, a first state quantity inside the cylinder, wherein the first state quantity is defined as an in-cylinder EGR ratio estimation, said in-cylinder EGR ratio estimation being based on each of an external EGR ratio and an internal EGR ratio, such that the external EGR ratio is calculated as a ratio of burned gas recirculated through an EGR passage with respect to fresh air passed through a throttle valve and intake air passed through an intake valve, and the internal EGR ratio is calculated as a ratio of the amount of burned gas reintroduced into the cylinder from the exhaust port of the engine with respect to a total gas amount introduced into the cylinder;
  wherein when the operating state of the engine is switched between the predetermined spark-ignition range and the predetermined compression ignition range, the fuel injection controlling module adjusts the fuel injection timing so as not to form and ignite stratified mixture gas around the ignition plug of the engine when the first state quantity has exceeded a predetermined threshold value, and the fuel injection controlling module adjusts the fuel injection timing so as to form and ignite stratified mixture gas around the ignition plug of the engine when the first state quantity has not exceeded the predetermined threshold value.

* * * * *